US012537200B2

(12) United States Patent
Meerholz et al.

(10) Patent No.: US 12,537,200 B2
(45) Date of Patent: Jan. 27, 2026

(54) POROUS ELECTRODE AND METHOD FOR ITS PREPARATION

(71) Applicant: Universität zu Köln, Cologne (DE)

(72) Inventors: Klaus Meerholz, Rösrath (DE); Heike Klesper, Bergisch Gladbach (DE); Ronald Alle, Cologne (DE); Tanja Tegeder, Cologne (DE)

(73) Assignee: Universität zu Köln, Cologne (DE)

( * ) Notice: Subject to any disclaimer, the term of this patent is extended or adjusted under 35 U.S.C. 154(b) by 957 days.

(21) Appl. No.: 17/598,121

(22) PCT Filed: Mar. 27, 2020

(86) PCT No.: PCT/EP2020/058732
§ 371 (c)(1),
(2) Date: Sep. 24, 2021

(87) PCT Pub. No.: WO2020/193757
PCT Pub. Date: Oct. 1, 2020

(65) Prior Publication Data
US 2022/0190339 A1    Jun. 16, 2022

(30) Foreign Application Priority Data
Mar. 28, 2019  (DE) .................. 102019204319.4

(51) Int. Cl.
*H01M 4/60* (2006.01)
*C07D 305/06* (2006.01)
(Continued)

(52) U.S. Cl.
CPC .......... *H01M 4/602* (2013.01); *C07D 305/06* (2013.01); *H01M 4/0404* (2013.01);
(Continued)

(58) Field of Classification Search
CPC ......... H01M 4/0404–0419; H01M 4/602–625; H01M 2004/021; C07D 305/06;
(Continued)

(56) References Cited

U.S. PATENT DOCUMENTS

2007/0221914 A1  9/2007  Becker et al.
2010/0308307 A1  12/2010  Meerholz et al.
(Continued)

FOREIGN PATENT DOCUMENTS

EP  1027572 A1 *  5/2002  .............. H01M 4/04
WO  2016126209 A1  8/2016

OTHER PUBLICATIONS

International Search Report for PCT/EP2020/058732 dated Jul. 2, 2020.
(Continued)

*Primary Examiner* — Jonathan G Leong
*Assistant Examiner* — Kan Luo
(74) *Attorney, Agent, or Firm* — Brown & Michaels, PC

(57) ABSTRACT

The present invention relates to an electrode comprising an organic compound prepared by polymerization of a triaryl amine having at least one reactive polymerizable group, whereby the organic compound has at least a bimodal pore size distribution. Moreover, the present invention relates to a method for the preparation of such an electrode.

16 Claims, 3 Drawing Sheets primary structure secondary structure

(51) Int. Cl.
  *H01M 4/02*    (2006.01)
  *H01M 4/04*    (2006.01)
  *H01M 4/62*    (2006.01)

(52) U.S. Cl.
  CPC ......... *H01M 4/0419* (2013.01); *H01M 4/625* (2013.01); *H01M 2004/021* (2013.01)

(58) Field of Classification Search
  CPC .... Y02E 10/549; H10K 50/85; H10K 85/631; H01L 21/02304; C08G 2261/3142–3162; C08G 2261/142
  See application file for complete search history.

(56) References Cited

U.S. PATENT DOCUMENTS

2017/0068125 A1*   3/2017   Paolini et al. ........ G02F 1/1343
2019/0305240 A1*   10/2019   Angioni et al. ........ H01L 51/50

OTHER PUBLICATIONS

Shirota Y et al: "Electrochemical doping of poly[4-(N,N-diphenylamino)phenylmethyl methacrylate], and rectification and photovoltaic properties", Synthetic Metals, Elsevier Sequoia, Lausanne, CH, vol. 18, No. 1-3, Feb. 1, 1987 (Feb. 1, 1987), pp. 399-404.

* cited by examiner

POROUS ELECTRODE AND METHOD FOR ITS PREPARATION

The present invention relates to an electrode comprising an organic compound prepared by polymerization of a triaryl amine having at least one reactive polymerizable group, and a method for producing these electrodes. Moreover, the present invention relates to electronic devices comprising said electrode.

The storage of electrical energy has become a key technology today. There is an urgent need for better storage options for renewable energies (water, wind, and solar) in order to be able to further reduce $CO_2$ emissions and thus secure the environment and our future. Meanwhile, our modern society is no longer conceivable without electronic aids. As a result, the demand for tailor-made energy stores for electronic devices is growing steadily.

The currently available technologies for the storage of energy have to be further improved. Depending on the application, different properties are needed. Batteries offer higher storage capacities and are more suitable for long-term storage of large amounts of energy. Supercapacitors can be charged and discharged very quickly and deliver very high-power densities. These supercapacitors serve e.g. as storage buffers in wind turbines, for rapid recuperation of braking energy in electric vehicles or for delivering very small currents in SRAM data memories. For other applications energy storage devices are needed, which have properties in between.

In most batteries, electrical energy is stored chemically and released again in a controlled manner when needed. A classic embodiment consists of a cathode and an anode, each in an electrolyte solution, separated by a separator membrane. There are a variety of design variants. In the following text, primary and secondary (=rechargeable) energy stores are described under the generic term "batteries".

According to a market report by Avicenne Energy in 2018, lithium-ion technologies (Li-ion batteries LiB and supercapacitors based on Li ions) are currently the sector in the energy storage field with the largest investments in the world and will continue to grow over the next decades. Compared to conventional batteries, they are much more powerful and efficient.

The main applications are currently in the field of light and starter batteries for vehicles, in the field of consumer electronics (e.g., cell phones, PCs, and tablets) as well as in the industrial sector (e.g., galley forklifts). In the automotive industry, the use of the lithium-ion technology is steadily increasing, not only in the field of e-mobility, but also in classic fuel-powered vehicles.

The cost of raw materials accounts to 50 to 70% of the cost of manufacturing Li-ion batteries, while cathode costs are the highest costs with approx. 27%. Currently, the following cathode materials are mainly used: $LiCoO_2$ (LCO), $LiMn_2O_4$ (LMO), $LiMPO_4$ (LFP), Li $[Ni_xMn_yCo_z]$ $O_2$ (NMC), and $Li[Ni_xCo_yAl_z]O_2$ (NCA). The main price drivers for these etched cathode materials are the raw material prices for cobalt and nickel.

However, besides the high energy density provided by Li-ion batteries, other properties also play a role depending on the specific intended application, such as longer lifetime, robustness, loading and unloading speed, lower weight, and special requirements such as special shapes or flexible designs. Moreover, the price, the safety, the consumption of raw materials and the disposal after the lifetime are very important parameters. There is a great economic potential here, but also enormous developments are needed.

All these parameters are largely determined by the materials used. This affects both their quality and the way they can be customized for battery applications.

Based on the high metal prices and the highly questionable mining conditions, there is a further need for polymeric metal-free electrode materials, which is reflected in numerous research activities. Organic redox-active polymers (ORP) based electrode materials consist mainly of the elements carbon, nitrogen and oxygen (C, N, O), i.e. from resource-saving raw materials. Other limited raw materials are not needed, and ORPs cause fewer problems in recovery, disposal and recycling. In addition, in some areas there is a need for electrodes that can be used under corrosive conditions, for which organic materials are sometimes more suitable than metals.

Another important point is the plasticity and, thus, the compatibility with flexible construction parts. In recent years, research is increasingly being done to develop flexible electrodes, such as electronic components printed on foils or other flexible substrates (printed electronics, flexible electronics) or so-called wearables (small electronic devices intended to be worn on the body to aid the wearer's everyday life). In this technical field, a multiplicity of completely new products are demanded and already developed.

The area of the Internet of Things (IoT), which also includes wearables, offers unprecedented possibilities for the future, but usually also requires a form of power supply. One area that is already established today, but still offers enormous growth and savings potential, relates to so-called real-time location systems (RTLS) and smart-active labels. Here, special wireless components are used to monitor in real time the movement of goods, people, vehicles or similar. Most of the RTLS also require a wireless power supply. They are used, for example, for monitoring driverless vehicles, in automated warehousing and logistics, but also in health, trade and production. Other products are for example beacons, dash buttons, sensors for smart metering, smart home applications and many more.

It is currently not foreseeable that metal-free (polymer) electrodes reach the energy density of Li-ion batteries since the molar mass of a redox unit in the established Li-ion batteries cathode materials (e.g. $LiCoO_2$=98 g/mol) is lower than in typical redox systems of active organic compounds (e.g. triphenyl amine=245 g/mol, functionalized triphenyl amines >300 g/mol). Nevertheless, due to other advantageous properties, organic metal-free electrodes could in future offer interesting environmentally friendly alternatives in some areas.

Starting from that technical background, polytriphenylamine compounds promise a variety of advantages. As described by J. K. Feng et al. in "Polytriphenylamine: A high power and high capacity cathode material for rechargeable lithium batteries" (J. Power Sources, 2008, Vol. 177, p. 199-204), the presented cathode consists of a highly conductive poly-p-phenylene backbone which was found to have high-rate storage and a high electronic conductive potential. As reported in C. Takahashi et al. in "Preparation and characterization of poly(4-alkyltriphenylamine) by chemical oxidative polymerization" (Synth. Met. 2002, Vol 129, p. 123) a coupling reaction of the triphenylamine takes place exclusively at the para-position of the unsubstituted N-phenyl rings. It is further remarked that charge transport films made out of electroactive organic material might deteriorate in performance over time by diffusion of the added charge transporting agent. This difficulty is hereby faced using a plasma treatment (US 2012/0238774 A1). Another approach to cope with charge transport challenges is to form a porous, organic polymer matrix doped with a conductive agent. Dai et al. developed a S/N-doped electron-conducting porous aromatic framework composition which is directed to be incorporated in lithium-sulfur batteries (US 2014/0141328 A1). The utilized porous organic framework is further described by T. Ben et al. in "Targeted synthesis of an electroactive organic framework" (J. Mater. Chem., 2011, Vol 21, p. 18208) and comprises an electroactive compound which is crosslinked by phenyl-phenyl-coupling.

The prior art documents solely regard triphenylamine compounds in a conjugated system with direct phenyl-phenyl connection and thus interaction. For that matter, S. Muench et al. in "Polymer-based Organic Batteries" (Chem. Rev., 2016, Vol 116, p. 9438-9484) notes that intrinsic conductivity, namely phenyl-phenyl-coupling, leads to varying cell voltage over the charging and discharging process. This majorly limits the range of possible applications.

BRIEF DESCRIPTION OF THE DRAWINGS

FIG. 5c shows a series of charge and discharge cycles of an electrode, according to an embodiment.

DETAILED DESCRIPTION OF THE INVENTION

Figure 1:
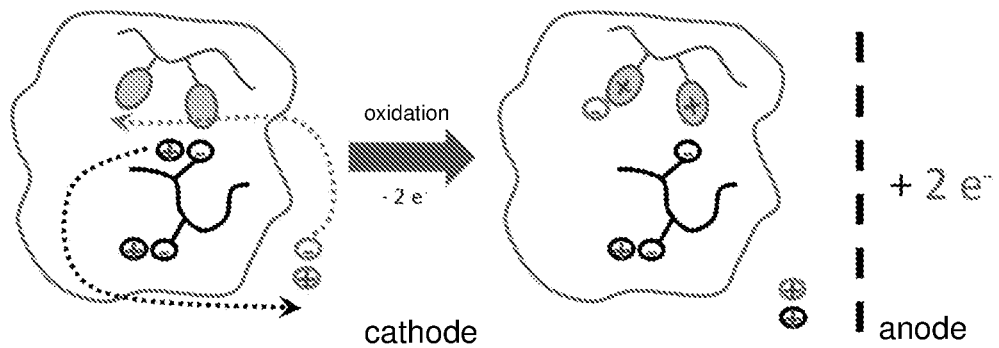
FIG. 1 shows a cathode material admixed with a salt consisting of a polyanion and low molecular weight cations, according to an embodiment.

To overcome the challenges discussed hereinabove, the present invention focusses on a non-conjugated system within the organic compound to guarantee independent charging and discharging. The targeted approach is a non-conjugated polymer backbone, to which the redox-units are attached in a way that they are not electronically coupled to each other. In such a system the redox-potential of each unit will be marginally, if at all, be influenced by the charging state of neighbouring redox-units. A possible chemical approach is disclosed by P. S. Rudati et al. in "The I-V characteristics of organic hole-only devices based on cross-linked hole-transport layer" (J. Appl. Res. Technol., 2015, Vol 13, p. 253-260) and might include an oxidative cross-linking mechanism with oxetane as a linker.

Furthermore, the present invention combines the non-conjugated triphenylamine composition with a porous matrix system. As it is already known for OLED (organic light-emitting diode) technology, spraying techniques lead to an intended porosity for polymeric hole conductor materials (DE 10 2007 000 791 A1). The porous redox-active buffer layer of the invention may be optimized to function as an electrode itself.

On the base of the prior art situation, it is the object of the present invention to provide metal-free (polymer) electrodes which overcome at least one of the above-mentioned disadvantages and which allow the commercial use.

To solve this object, the present invention proposes a metal-free polymeric electrode material which can be adjusted in its porosity by a special processing method, whereby the pore size and thus of the contact surface to the electrolyte solution is adapted. In addition, the wettability of the electrode surface and permeation of the porous structure should be deliberately adjusted by chemically bonded substituents and the mechanical stress due to the so-called "breathing" of the electrode should be reduced. Thus, the ORP electrodes according to the present invention should be able to be optimized as an electrode for various energy storage devices (e.g., Li ion cells, thin film batteries, electrochemical cells, and supercapacitors), but also as an electrode for other electrical components.

In a first aspect, the present invention now focusses on electrodes that are metal-free, environmentally friendly and flexible.

I. Electrode

The electrode according to the present invention is described as follows:

In a first aspect, the present invention relates to an electrode comprising an organic compound prepared by polymerization of a triaryl amine having at least one reactive polymerizable group, characterized in that in the organic compound at least a part of the aryl moieties of the triaryl amine are non-conjugately connected to each other. This means that the aryl moieties of the organic compound are connected to each other over a backbone which is not electronically conjugated which means further that the aryl moieties of the organic compound are connected to each other over a backbone which does not comprise conjugated double bonds.

This specific structure of the organic compound in which the aryl moieties are decoupled from each other allows to realize a more constant voltage curve over the whole duration of the discharging and charging of the electrode in the sense of the present invention.

In a second aspect, the present invention relates to an electrode comprising an organic compound prepared by polymerization of a triaryl amine having at least one reactive polymerizable group. The electrode according to the present invention is characterized in that the organic compound has at least a bimodal pore size distribution.

Based on the at least bimodal pore size distribution, channels and/or pores are available in the resulting electrode material into which the electrolyte solution (solvent and salt) can penetrate. These channels and/or pores constitute the first part of the at least bimodal pore size distribution. Moreover, the particles have smaller substructure pores, which allow an even deeper penetration of the electrolyte solution into the electrode and an even larger contact area with the electrolyte solution. These substructure pores constitute the second part of the at least bimodal pore size distribution.

The extremely large surface of the electrode allows faster charge exchange and thus faster charging and discharging and thus has a positive effect on the achievable power density. With previously known techniques, the porosity of environmentally friendly polymer electrodes could by far not be sufficiently adjusted. After fixation of the structure by cross-linking, the material can be mechanically compacted as needed, e.g. by calendaring or pressing. The porous structure holds the electrolyte solution already by capillary forces. To increase the leakage safety even further, the electrolyte solution can also be polymerized or crosslinked after penetration.

In the sense of the present invention, at least a bimodal pore size distribution means a bimodal, trimodal or multimodal pore size distribution.

In energy storage devices, such as batteries or supercapacitors, the electrodes usually comprise a redox-active component (which is in the present case the polymerized triaryl amine compound), a conductive component (often carbon itself) and a binder for the good adhesion between the different components and to the electrode substrate (which is usually the current collector) on which the redox-active component, the conductive component and the binder is applied.

Thus, the polymerized triaryl amine compound used in the electrode according to the present invention is usually applied on the electrode substrate together with a binder. Anything that binds the conductive carbon component and the redox-active component together and improves adhesion to the electrode substrate/current collector is used as the binder.

Usually, up to 10 wt.-% binder, based on the overall amount of the redox-active component, the conductive component and the binder, is used in the present invention in the coating of the electrode substrate/current collector.

Moreover, it is preferred to provide the binder in a low amount so as not to unnecessarily lower the amount of the redox-active material in the electrode. In some cases, even no binder needs to be applied.

As the binder serves to hold the redox-active material and other components together, the binder should be soluble in the same solvent as the redox-active material and should retain some plasticity so that the resulting electrode materials do not become brittle and thus mechanically unstable.

The binder can also be used as a plasticizer to render the resulting network more flexible in order to make the electrode material more tolerant against volume changes that are induced by incorporating or releasing ions during charging and discharging.

Usually, the binder is selected from the group consisting of a resilient, not brittle, sometimes even flexible, chemically inert and temperature resistant polymeric material.

More preferably, the binder has a low coefficient of thermal expansion.

Further preferred, the binder is thermoplastic or can be polymerized or otherwise cured.

In particular, the binder is selected from the group of polymers consisting of polyvinylidene fluoride, polytetrafluoroethylene, fluororubber (which is a terpolymer of tetrafluoroethylene, vinylidene fluoride and hexafluoropropylene), polyvinyl polymers such as polyvinylidene fluoride, polyvinylidene fluoride/hexafluoropropylene copolymer, polyacrylonitrile, polymethyl methacrylate, polytetrafluoroethylene (PTFE), a styrene-butadiene rubber-based polymer, polyvinylpyrrolidone, polyamides, polyurethanes; ethylene acrylic acid (EAA) copolymers, ethylene methacrylic acid (EMAA) copolymers, polyethylene (PE), polypropylene (PP), ethylene-propylene-diene terpolymers (EPDM), polybutylene, ionically cross-linked ethylene methacrylic acid copolymer, ethylene n-butyl acrylate (EnBA) polymers, ethylene vinyl acetate (EVA) polymers, ethylene ethyl acrylate (EEA) copolymer, ethylene methyl acrylate (EMA) copolymer, bisallylnadiimide or allylnadiimide, polysulfones, polyethersulfones, polyimides, polyamide-imides, epoxy resins, oxetane-resins, polyarylene ether ketones such as, chloromethylated polyarylene ether ketones, acryloylated polyarylene ether ketones, a nitrile rubber, an ethylene-propylene rubber, a styrene-butadiene rubber, polyetherimides, polystyrene, and the like and chloromethylated polyethersulfones and acryloylated polyethersulfones, polymethyl methacrylate, a polysulfide rubber, cyanoethyl cellulose, methyl cellulose, and oligomer and blends thereof.

In a preferred embodiment of the present invention, the binder is selected from the group consisting of a polyvinylidene fluoride, a polyvinylidene fluoride/hexafluoropropylene copolymer, a polyvinylidene fluoride, a polyacrylonitrile, a polymethyl methacrylate, a polytetrafluoroethylene (PTFE), an epoxy-resin, an oxetane-resin, and a styrene-butadiene rubber-based polymer.

Moreover, the organic compound used in the electrode may be provided in the geometrical form of particles, platelets or fibers.

However, the geometrical form of the particles of the organic compound used in the electrode as a polymerized material is not restricted and further examples of these geometrical forms are vermicular, spindle-shaped, disk-shaped and essential spherical forms.

As already mentioned, the organic compound used in the electrode as a polymerized material has an at least bimodal pore size distribution. Moreover, it is possible that the organic compound used in the electrode as a polymerized material has a trimodal or multimodal pore size distribution.

These pore size distributions are provided by at least first and second pores (bimodal pore size distribution) or at least first, second and third pores (trimodal pore size distribution) or at least first, second, third and fourth (and even more) pores (multimodal pore size distribution).

In all these bimodal, trimodal or multimodal arrangements of the organic compound used in the electrode as a polymerized material, first and second pores are present, whereby in case the organic compound used in the electrode as a polymerized material is provided as particles and/or platelets the first pores preferably have a size of less than 10 µm, more preferably between 0.5 and 8 µm, most preferably between 1 and 6 µm.

In all these bimodal, trimodal or multimodal arrangements of the organic compound used in the electrode as a polymerized material, first and second pores are present, whereby in case the organic compound used in the electrode as a polymerized material is provided as particles and/or platelets the second pores preferably have a size of less than 250 nm, more preferably between 20 and 250 nm, most preferably between 20 and 180 nm.

In all these bimodal, trimodal or multimodal arrangements of the organic compound used in the electrode as a polymerized material, first and second pores are present, whereby in case the organic compound used in the electrode as a polymerized material is provided as fibers the first pores preferably have a size of less than 50 µm, preferably between 2 and 20 µm, most preferably between 5 and 20 µm.

In all these bimodal, trimodal or multimodal arrangements of the organic compound used in the electrode as a polymerized material, first and second pores are present, whereby in case the organic compound used in the electrode as a polymerized material is provided as fibers the second pores preferably have a size of less than 150 nm, more preferably between 10 and 150 nm, most preferably between 20 and 150 nm.

Based on the unique and specific method of producing the polymerized organic compound, which is described below, these different pores are constituted differently on the resulting electrode material. Accordingly, the second pores are pores which are in general provided within the continuous structure of one particle, platelet or fiber of the organic compound, wherein the first pores are pores provided between separate particles, platelets or fibers.

The organic compound used in the electrode as a polymerized material is usually provided on the electrode substrate/current collector.

In the following, the organic compound used in the electrode as a polymerized material is described in more detail by referring to the monomer constituting the polymeric material on the electrode.

In the sense of the present invention, a polymeric network and not just a polymeric chain is preferred. The density of the network is determined by the degree of cross-linking, i.e. by the number of cross-linkable groups. For example, if one takes only triarylamines with one crosslinkable group, one gets only a short chain. This chain may under specific situations be too soluble. However, if one mixes triarylamines with one and those with two crosslinkable groups, a network will result.

The triaryl amine having at least one reactive polymerizable group is preferably a compound of the following general formula (I)

(I)

whereby
$R^1$, $R^2$, $R^3$ are optionally substituted phenyl rings,
$R^1$ and $R^2$ may be linked together;
at least one of $R^1$, $R^2$, $R^3$ is substituted by $R^{4'}$,
whereby
$R^{4'}$ is selected from:

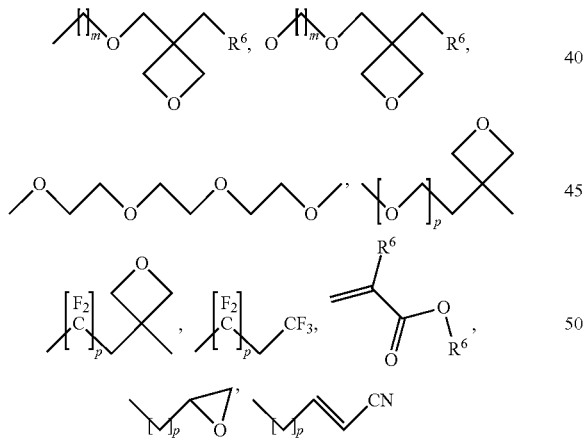

wherein m is an integer of 1 to 8, p is an integer of 0 to 8; and $R^6$ is selected from H, F, Cl, Br, I, CN, $CF_3$, $(CF_2)_{n'}CF_3$, $CCl_3$, $Cl_3$, $CBr_3$, $SO_3Na$, $SO_3K$, $SO_3Li$, $SO_3H$, phosphate, acetate, $NH_2$, $NO_2$, $NHR$, $NR_2$, Me, $(CH_2)_{n'}Me$, Ar, $O(CH_2)_{n'}Me$, OH, OMe, OAr, $O(CH_2)_{n'}Me$, $O(CH_2O)_{n'}$, COOH, COOMe, $COO(CH_2)_{n'}Me$, COOAr, MeO and whereby n' is an integer of 0 to 6.

In a first specific embodiment of the present invention, the triaryl amine having at least one reactive polymerizable group is preferably a dimer triaryl amine covered by the general structure (II) below:

(II)

wherein $R^1$, $R^2$ are optionally substituted phenyl rings;
$R^1$ and $R^2$ may be linked together; and
$R^3$ is a bi- or trivalent optionally substituted phenyl ring.
In this first specific embodiment of the present invention, at least one of $R^1$, $R^2$, $R^3$ is substituted by $R^{4'}$
$R^3$ is preferably a bi- or trivalent optionally substituted phenyl ring selected from the following groups:

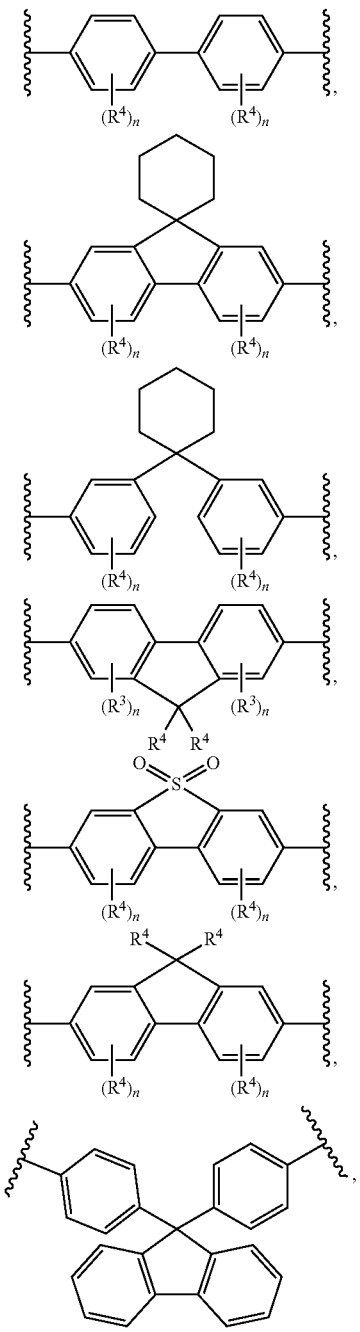

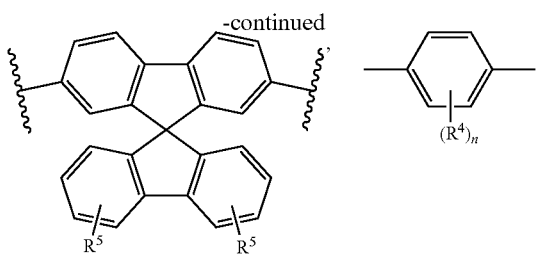 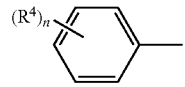

wherein $R^4$ is selected from:
H, F, Cl, Br, I, CN, $CF_3$, $(CF_2)_n CF_3$, $CCl_3$, $Cl_3$, $CBr_3$, $SO_3Na$, $SO_3K$, $SO_3Li$, $SO_3H$, $NH_2$, $NO_2$, NHR, $NR_2$, Me, $(CH_2)_n Me$, Ar, $O(CH_2)_n Me$, OH, OMe, $O(CH_2O)_{n'}$, OAr, $O(CH_2)_n Me$, COOH, COOMe, $COO(CH_2)_n Me$, COOAr, MeO or $R^{4'}$ and whereby n' is an integer of 0 to 6,
whereby $R^{4'}$ is selected from

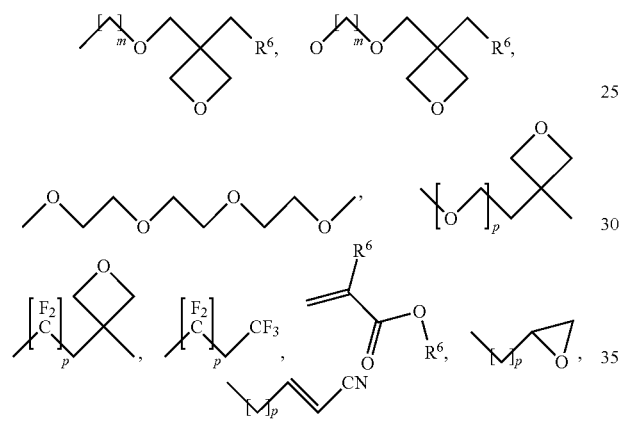

wherein $R^5$ is

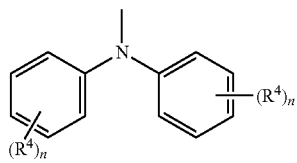

and
whereby at least one of $R^4$ might be $R^{4'}$,
wherein n is an integer of 0 to 5 and m is an integer of 1 to 8.

In a second specific embodiment of the present invention, the triaryl amine having at least one reactive polymerizable group is preferably a monomer triaryl amine covered by the general structure (III) below:

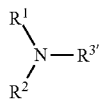 (III)

whereby
$R^1$, $R^2$ are optionally substituted phenyl rings;

$R^1$ and $R^2$ may be linked together; and
$R^{3'}$ is a compound with the general structure

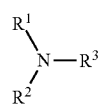

n is an integer of 0 to 4 and
$R^4$ is selected from the group consisting of H, F, Cl, Br, I, CN, $CF_3$, $(CF_2)_n CF_3$, $CCl_3$, $Cl_3$, $CBr_3$, $SO_3Na$, $SO_3K$, $SO_3Li$, $SO_3H$, $NH_2$, $NO_2$, NHR, $NR_2$, Me, $(CH_2)_n Me$, Ar, $O(CH_2)_n Me$, OH, OMe, $O(CH_2O)_{n'}$, OAr, $O(CH_2)_n Me$, COOH, COOMe, $COO(CH_2)_n Me$, COOAr, MeO and $R^{4'}$,
n' is an integer of 0 to 6,
whereby $R^{4'}$ is selected from

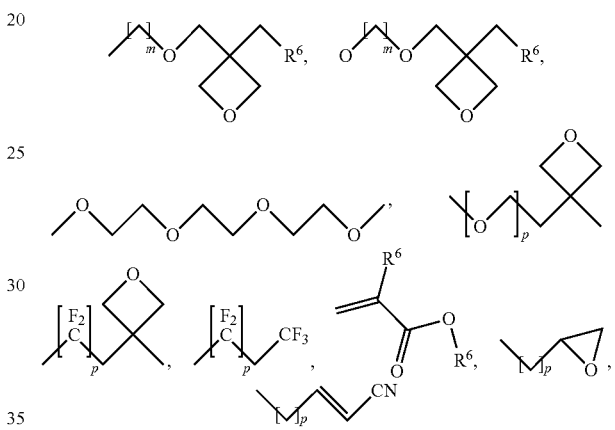

wherein m is an integer of 1 to 8; and p is an integer of 0 to 8; and
$R^6$ is selected from H, F, Cl, Br, I, CN, $CF_3$, $(CF_2)_n CF_3$, $CCl_3$, $Cl_3$, $CBr_3$, $SO_3Na$, $SO_3K$, $SO_3Li$, $SO_3H$, $NH_2$, $NO_2$, NHR, $NR_2$, Me, $(CH_2)_n Me$, Ar, $O(CH_2)_n Me$, OH, OMe, OAr, $O(CH_2)_n Me$, $O(CH_2O)_{n'}$, COOH, COOMe, $COO(CH_2)_n Me$, COOAr, MeO,
whereby n' is an integer of 0 to 6.

In both embodiments, the first and the second embodiment, the triaryl amine having at least one reactive polymerizable group is a compound of the following general formula (I)

 (I)

wherein $R^1$ and $R^2$ are preferably

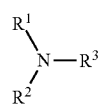

which may be linked together; and
and whereby n is an integer of 0 to 4 and R is selected from the substituents of $R^4$ and $R^{4'}$.

In the following, specific examples of the compound according to formula (I), (II), and/or (III) are shown:
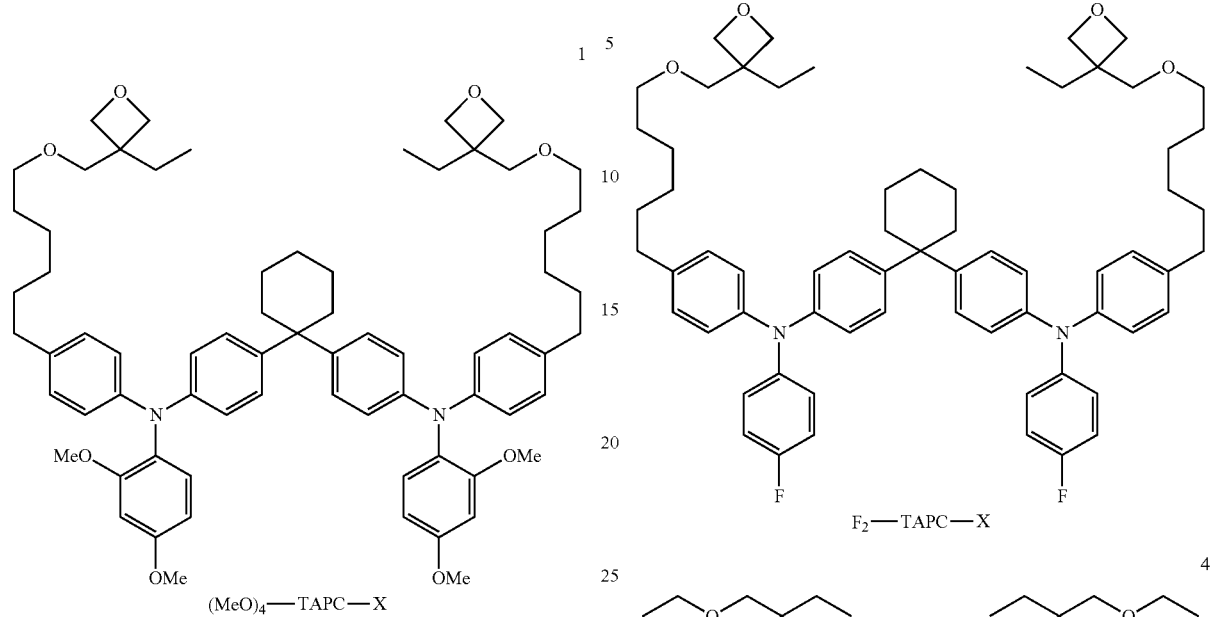
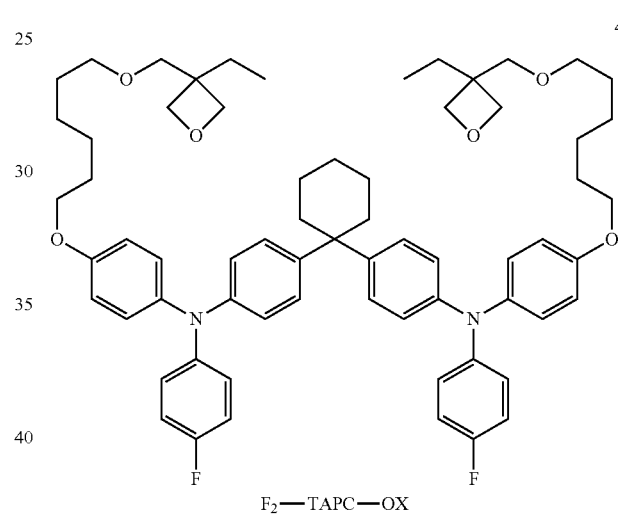
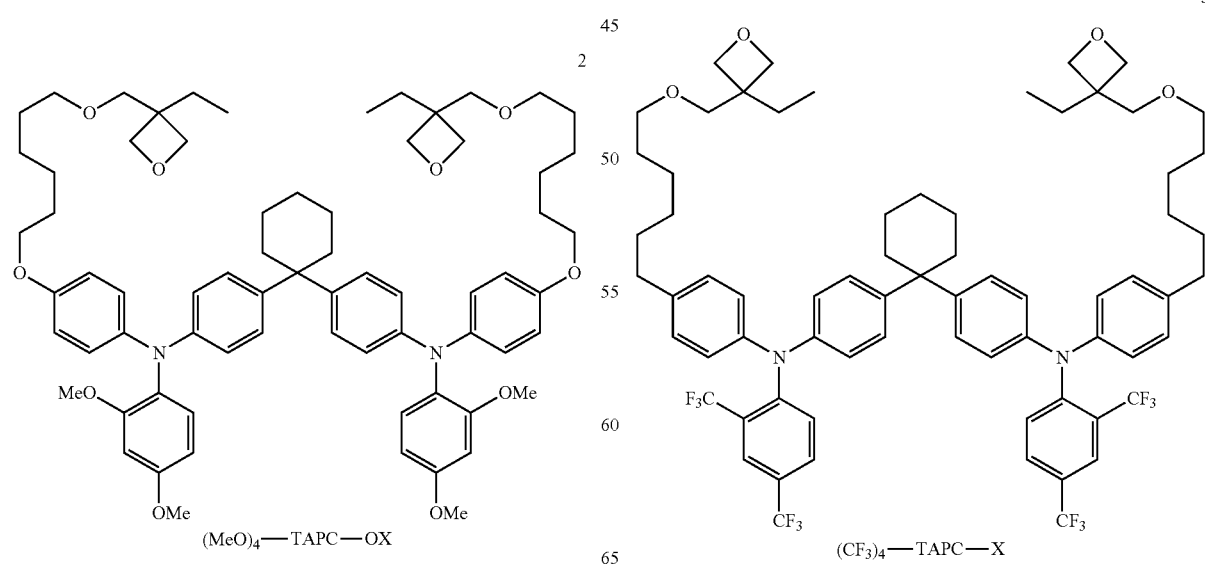

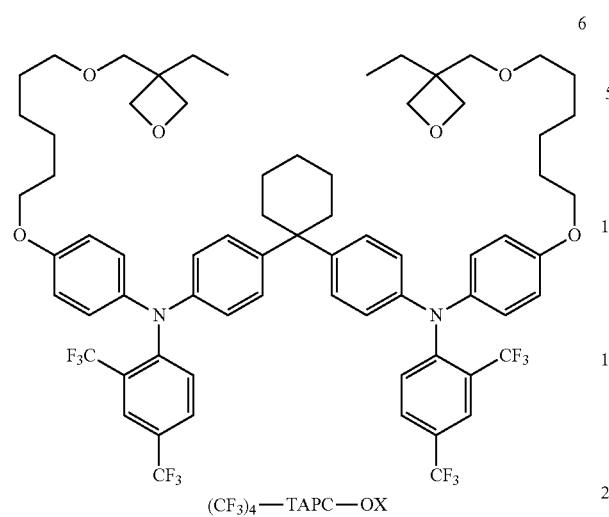
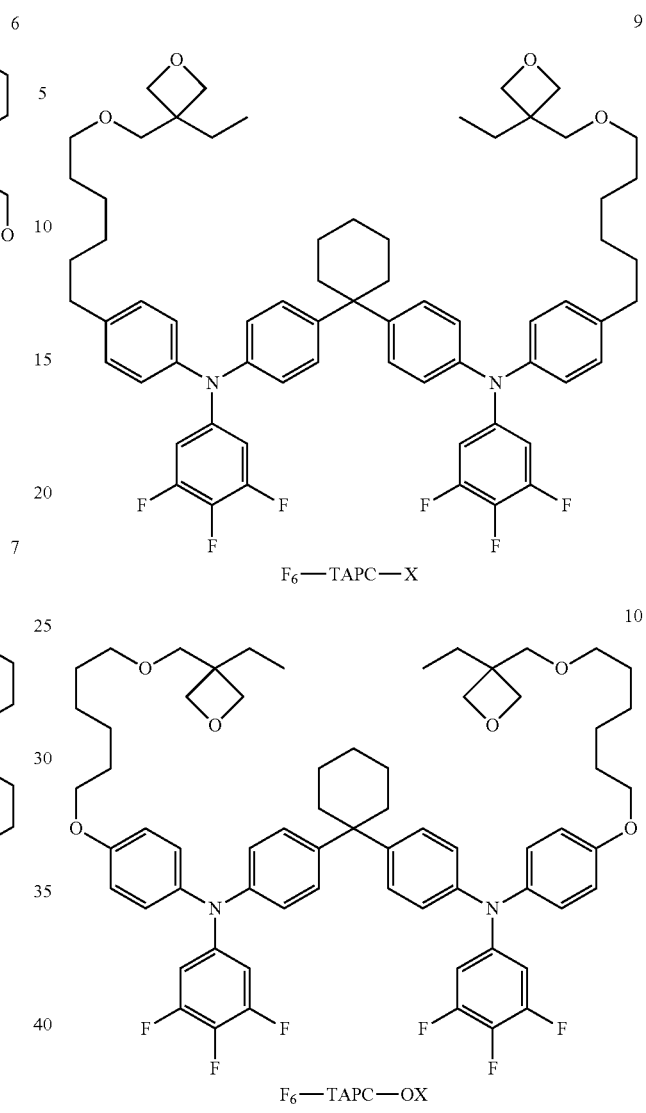
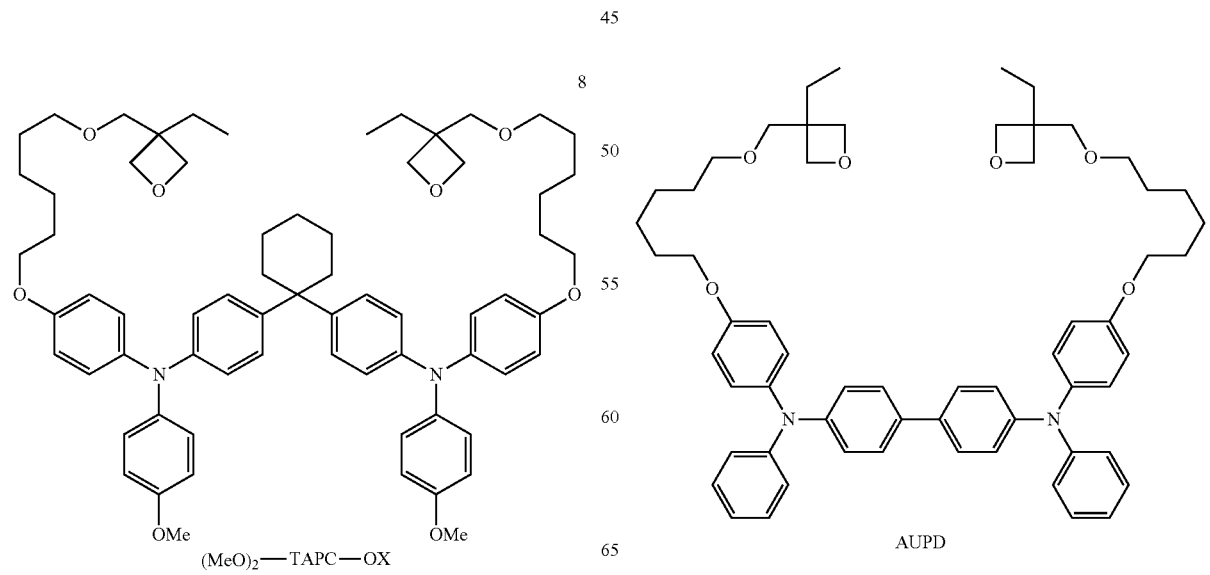

-continued
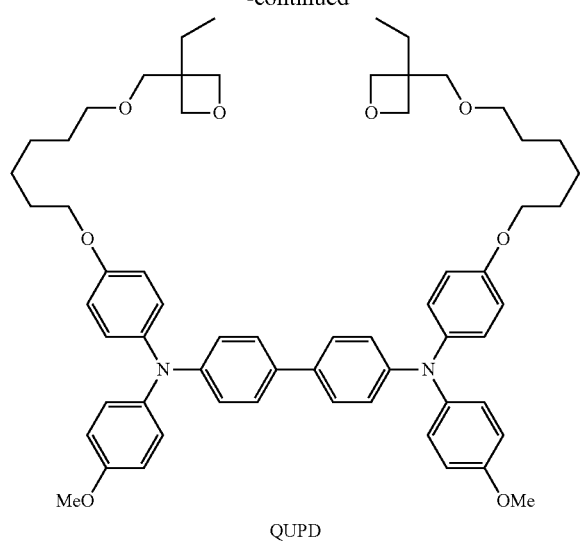
QUPD
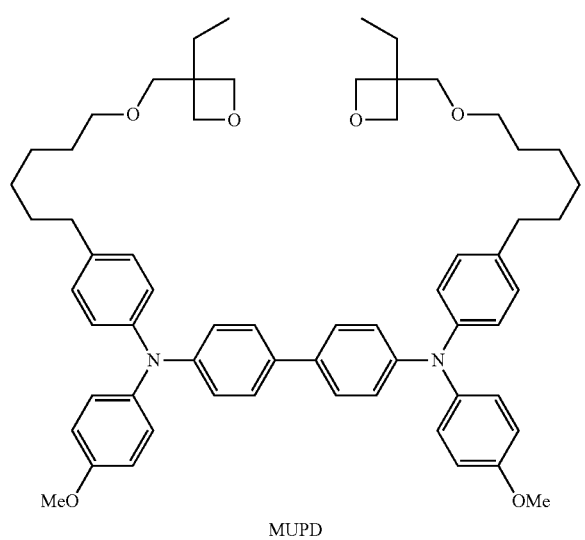
MUPD
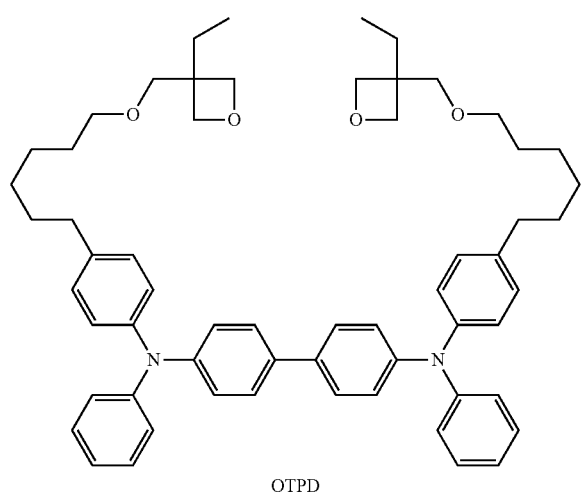
OTPD
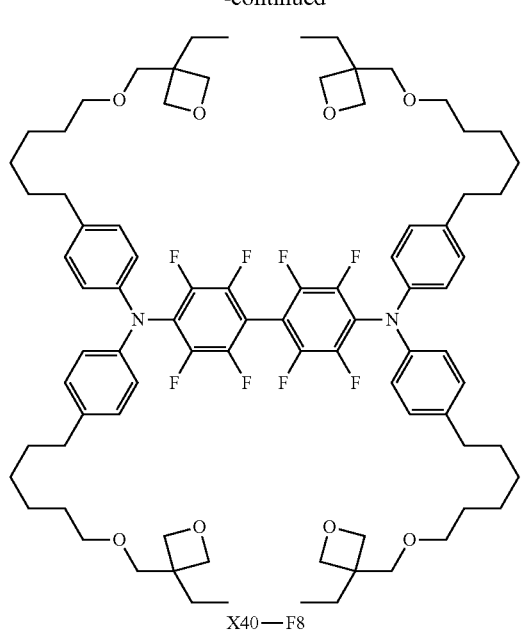
X40—F8
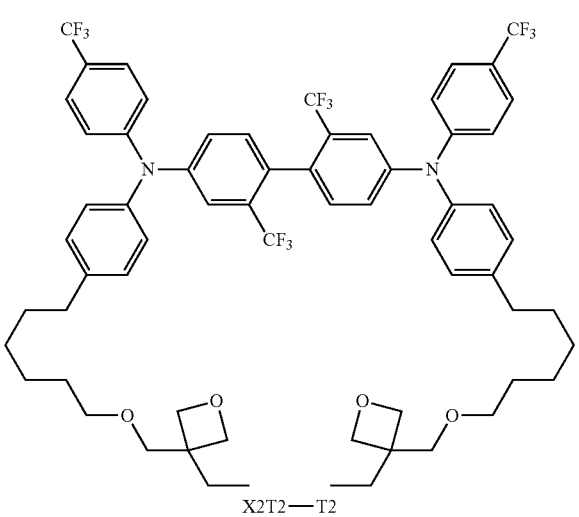
X2T2—T2
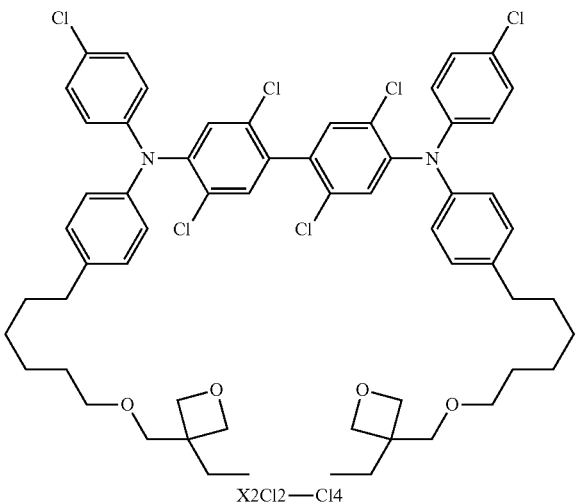
X2Cl2—Cl4

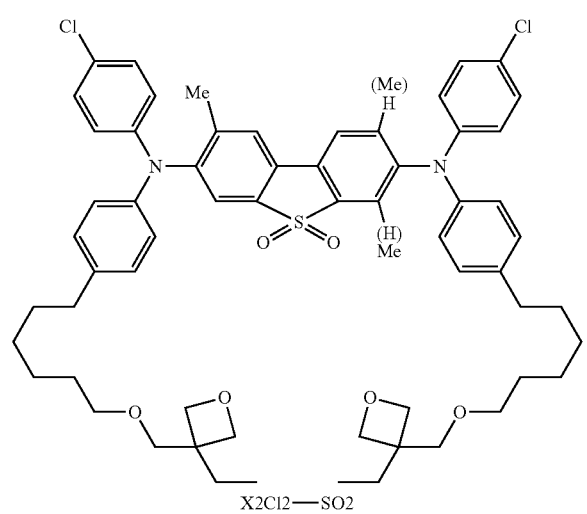
X2Cl2—SO2
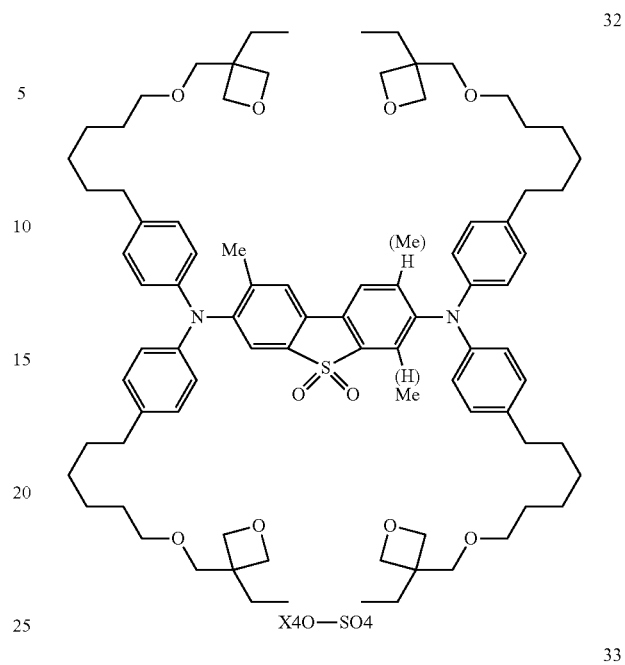
X4O—SO4
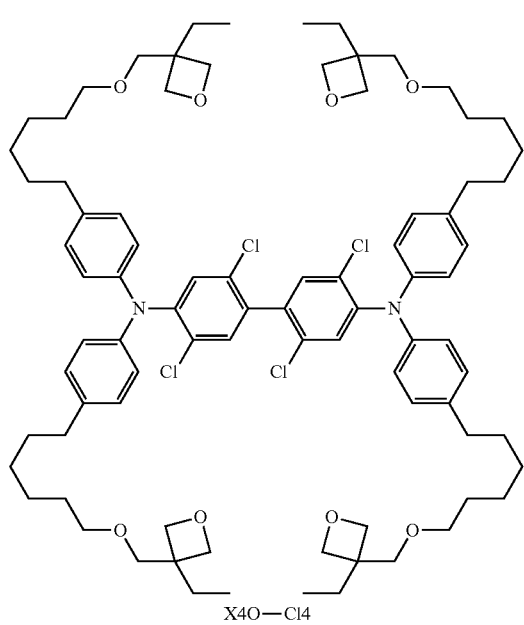
X4O—Cl4
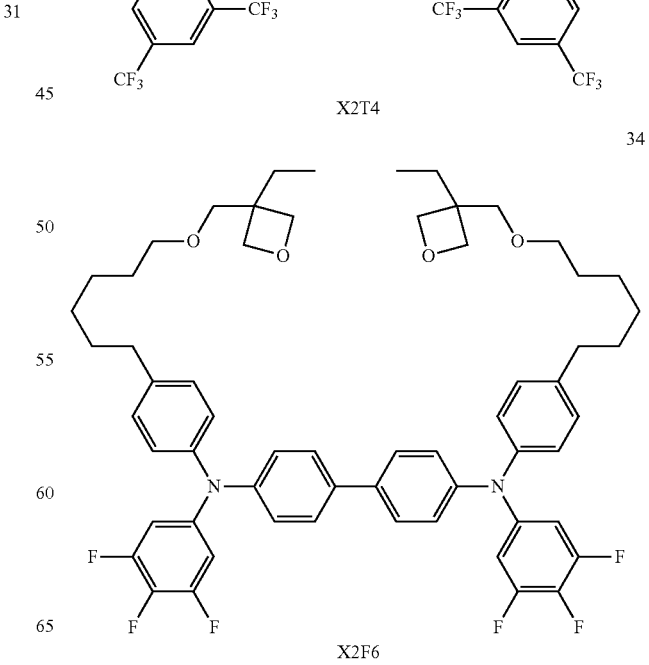
X2T4
X2F6

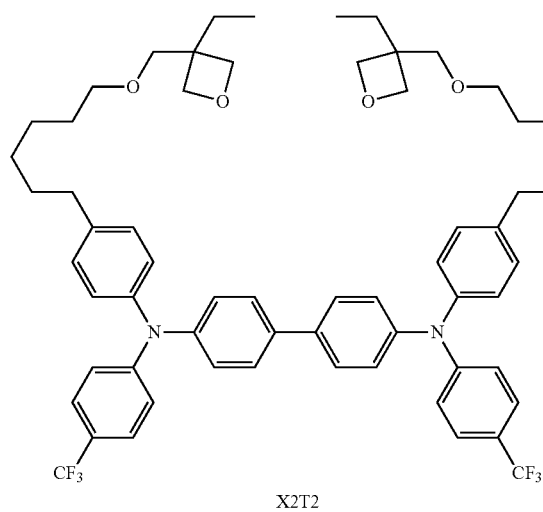
X2T2
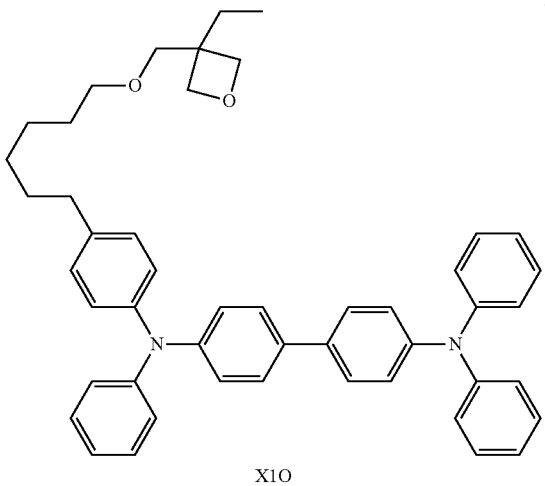
X1O
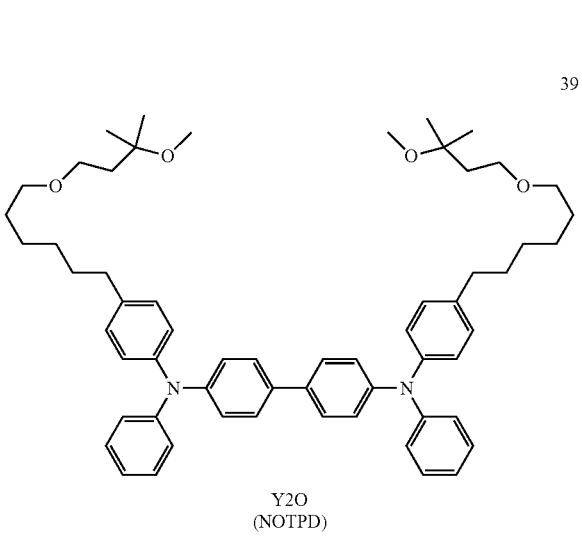
Y2O
(NOTPD)
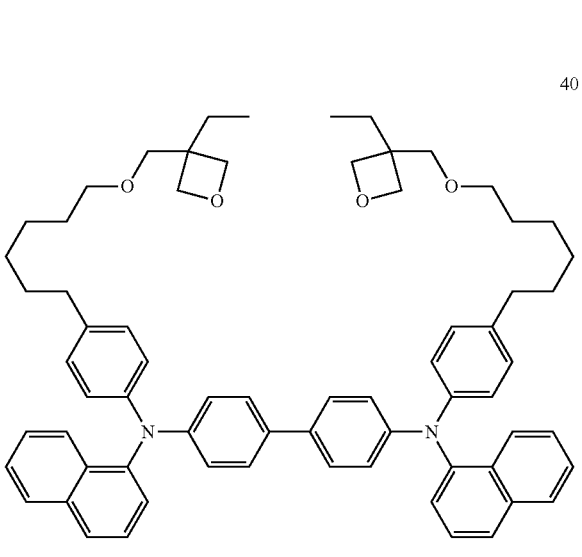
X2OαNa
X2F4
X2F2

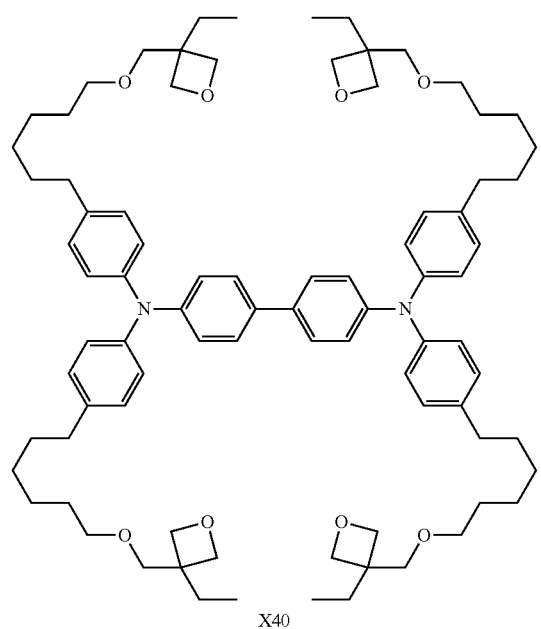
X40
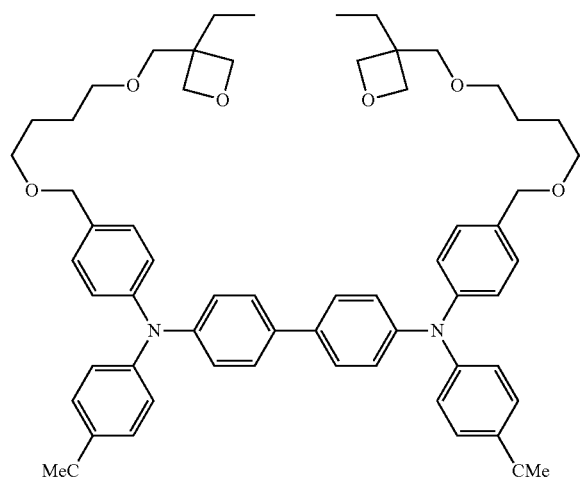
X2BM
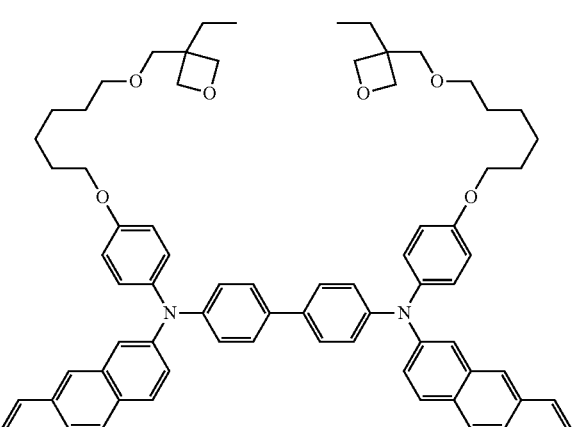
X2AβNa
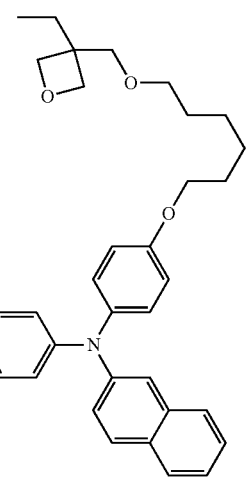
X2AAnt
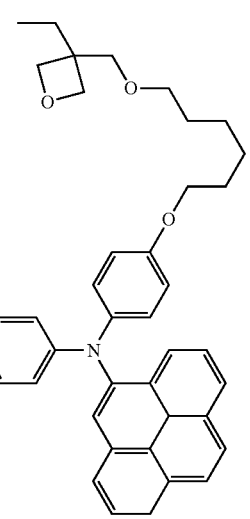
X2APy -continued

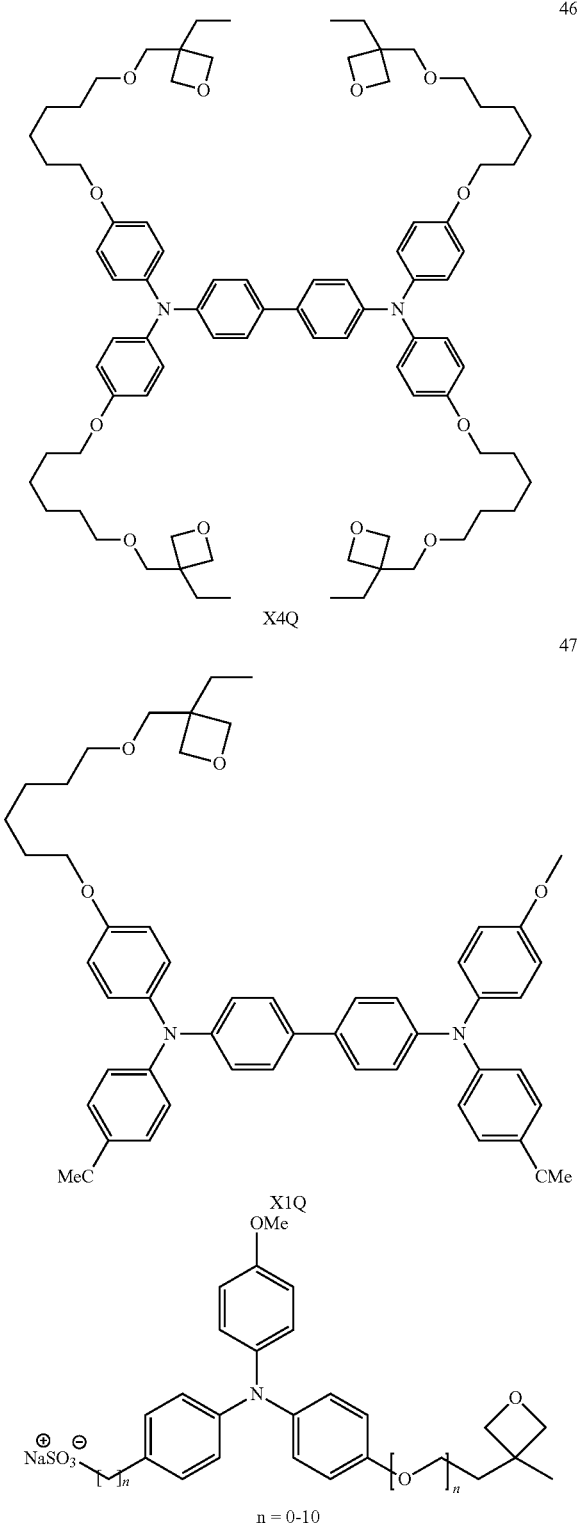

X4Q

X1Q n = 0-10

The organic compound can be composed of one sort of equal molecules of the above described structure, of a mixture of two or several of these molecules in any mixing rate.

The electrode according to the present invention may comprise additionally at least one electric conductive material.

This additional at least one electric conductive material is preferably selected from the group consisting of battery soot, nano tubes, graphene, and PEDOT.

Further examples of the conductive material comprise at least one selected from carbon fiber, such as carbon black (acetylene black, 350G, carbon fiber (VGCF), carbon nanotubes (CNTs), Ketjen black (Ketjenblack EC300J, Ketjenblack EC600JD, Carbon ECP, Carbon ECP600JD)), graphite particles, natural graphite, artificial graphite, graphene, graphene oxide, expanded graphene; a metal powder, a metal fiber, and a metal tube, such as at least one selected from Cu, Ni, Al, and silver (Ag), and an electrically conductive polymer, such as a poly-phenylene derivative, but are not limited thereto. Any material suitable as a conductive material in the art may be used, such as polypyrrole, polyphenylene vinylene, polyaniline, polythiophene, poly-3-hexylthiophen, and polyfluorene.

In general, the amount of all conductive materials in the electrode material, in which the organic compound as a polymerized material is used, is at least 5 wt.-% and not more than 40 wt.-%.

Moreover, the electrode according to the present invention may comprise additionally at least one additive.

This additional at least one additive is preferably selected from the group consisting of non-redox active materials selected from the group consisting of polystyrene, PVK, PMMA, polyethylene, polypropylene, polyacrylonitrile, polyamide, polyester, polyurethane, adhesion promotors, wetting promotors, self-assembled monolayer additives, and epoxy resins.

In general, the amount of all non-conductive materials in the coating on the electrode, in which the organic compound as a polymerized material is used, is not more than 50 wt.-%.

In further preferred embodiment of the present invention, the triaryl amine having at least one reactive polymerizable group and being polymerized allows a so-called balanced ion movement (BMI) which basic concept is described in the following:

Due to the addition of a salt (case I below), preferably a polymeric salt, to the triaryl amine having at least one reactive polymerizable group and being polymerized, or due to the covalent attachment of ionic groups (case II below) to the triaryl amine having at least one reactive polymerizable group and being polymerized, the charge balance during charging or discharging by the transport of both ion types (positive and negative) at the same time (balanced ion movement, BIM) can be achieved more easily.

The type of ion, which is used in the redox system for charge compensation, can be realized by three different ways:
  (1) the addition of a salt (polymeric anion) (case I, FIG. 1);
  (2) the covalent attachment of anionic groups (case II, FIG. 2); or
  (3) the covalent bonding of anionic groups and crosslinking of the electrolyte (case III, FIG. 3).

These three cases I to III are described now in detail in the following:

There occurs an ion movement in both directions (into and out of the electrode material) during each charge and discharge process of a battery in which the electrode is used. This ion movement is described by the following example: During charging, a cathode material is oxidized. For charge equalization, anions migrate from the electrolyte (solvent plus salt) into the cathode material (←) and cations of the polyelectrolyte added to the redox-active material from the composite material into the electrolyte (→). The migration of (solvated) ions into and out of the cathode material changes its volume during charging and discharging. In the above described example simultaneously migration of ions into the cathode and migration of ions out of the cathode occur. As a result, the volume change of the cathode is reduced and thus it is reduced or avoided, that the electrode is subjected to mechanical stress and cracking of the material, loss of adhesion to the current collector or spalling of parts of the redox material. By optimizing the mixing ratio or depending on the type of ion, a volume change may be reduced or completely avoided in the present invention.

Figure 2:
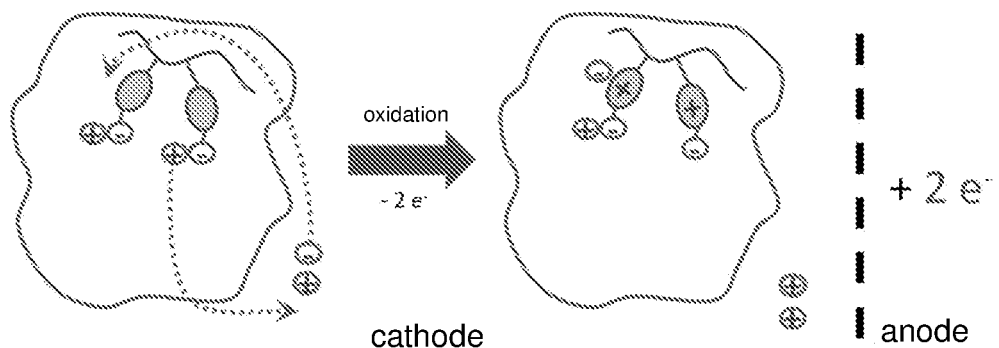
FIG. 2 shows a cathode material chemically modified to become a salt consisting of a directly attached anion and low molecular weight cations, according to an embodiment.
Figure 3:
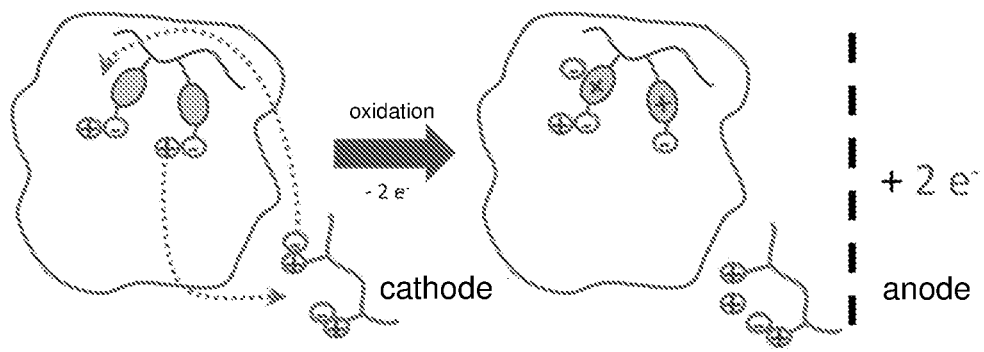
FIG. 3 shows a cathode material with covalent bonding of anionic groups and crosslinking of an electrolyte, according to an embodiment.

The FIGS. 1 to 3 illustrate this procedure for a cathode in three different ways (case I to III):

FIG. 1 relates to case I, the addition of a salt (polymeric anion). The cathode material is admixed with a salt consisting of a polyanion and low molecular weight cations. An example could be the lithium or sodium salt of polystyrene sulfonic acid (Li PSS or Na PSS). During charging, the cathode material is oxidized (in the figure twice). For charge equalization, anions migrate from the electrolyte (solvent plus salt) into the material (←) and cations of the polyelectrolyte added to the redox-active material migrate from the composite material into the electrolyte (→).

FIG. 2 relates to case II, the covalent attachment of anionic groups. The cathode material is chemically modified (covalent attachment) and thus becomes a salt itself, consisting of a directly attached anion and low molecular weight cations. The anionic groups covalently bonded to the redox system could, for example, be sulfonate, phosphate, acetate groups or the like. Suitable cationic counterions are, for example, Na$^+$ or Li$^+$. As in Case I, the cathode material is oxidized (in the FIG. 2 twice). For charge equalization, anions migrate from the electrolyte (solvent plus salt) into the material (←) and cations of the covalently bonded ionic groups in the cationic redox system migrate from the material into the electrolyte (→). This case II is preferred because the addition of a redox inactive material (polymer backbone as in case I) is avoided.

FIG. 3 relates to a further case III, the covalent bonding of anionic groups and crosslinking of the electrolyte. In addition to case I or case II, the electrolyte could initially be a liquid which is crosslinked after filling (penetration into the pore structure). This is advantageous for use because leakage of the electrolyte is no longer possible. Since the anion migrates from the electrolyte into the redox system, a cationic network with low-molecular anions must be formed after crosslinking. Such a material could consist of a crosslinkable ionic liquid (without further solvent). Possible crosslinkable ionic liquids are, for example,

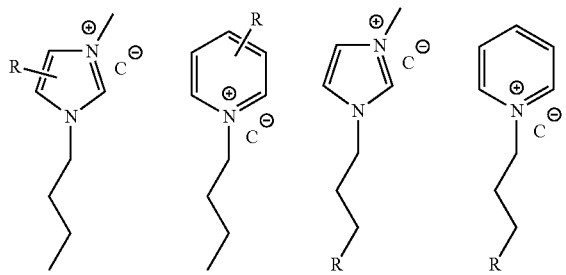

R = spacer + oxetane, MMa, styrene, etc.

A$^\ominus$ = anion

As in case I and case II, the cathode material is oxidized (in the FIG. 3 twice). For charge equalization, anions from the crosslinked electrolyte migrate into the material (←) and cations of the covalently bonded ionic groups in the cationic redox system migrate from the material into the electrolyte (→). Analogous to case II also cations of a polyelectrolyte added to the cationic redox system could migrate into the electrolyte.

Taking this concept into consideration, it is preferred that the triaryl amine compound described above
 a) is used together with a salt (polymeric anion);
 b) comprises at least one covalent bonded anionic group; or
 c) comprises at least one covalent bonded anionic group and is used together with a cross linked electrolyte.

The ionic substituent used in the triaryl amine having at least one reactive polymerizable group and being polymerized is preferably selected from the group consisting of sulfate, phosphate, carbonate, sulfonium, phosphonium, and ammonium. The ionic substituent is preferably saturated with a cation.

Moreover, it is preferred that the triaryl amine compound being polymerized comprises a polar substituent. The polar substituent is preferably selected from the group consisting of —O(CH$_2$)$_n$Me, —OH, —OMe, —OAr, —O(CH$_2$)$_n$Me, —COOH, —COOMe, —COO(CH$_2$)$_n$Me, —COOAr, O(CH$_2$O)$_n$, —F, —Cl, Br, —I, —CN, —(CF$_2$)$_n$CF$_3$, —(CCl$_3$)$_x$, —(Cl$_3$)$_x$, —(CBr$_3$)$_x$, —SO$_3$Na, —SO$_3$K, —SO$_3$Li, —SO$_3$H, —NH$_2$, —NO$_2$, NHR, and NR$_2$ (with n being an integer of 0 to 8, preferably 1 to 6; x being an integer of 0 to 8, preferably 1 to 6; and R being C$_1$- to C$_8$-alkyl, preferably C$_1$- to C$_8$-alkyl).

The electrode according to the present invention which is described above can be used in any electronic devices with electrodes, such as a primary or secondary electrochemical cell.

Whether the triaryl amine compound being polymerized is used in a cathode or in an anode depends on the particular counter electrode used. The decisive factor is whether the achievable potential difference, which is achieved between anode and cathode, is sufficient for the respective application. Depending on whether used as cathode or anode the nomenclature of the descriptions above may change accordingly.

Accordingly, the electrode according to the present invention can be used as an anode or a cathode, whereby the use of the electrode according to the present invention is preferably a cathode.

The electrode according to the present invention is preferably a cathode and the triaryl amine compound being polymerized can be tuned in a broad range with electron-donating or withdrawing substituents in its electrochemical potential.

The electrode according to the present invention can be used as a cathode in energy storage devices with the following anode materials selected from the group consisting of graphite, LTO (lithium titanate oxide), Si, Si—C composites, Si alloys, Mg, Mg composites, Mg alloys, transition metal-based anodes, Sn-based anodes, Li alloys with Al, Mg, Si, Sn, Li, Ca, and Al. Other examples of anode materials that can be used with our materials as a cathode can be found in Simon Muench, Andreas Wild, Christian Friebe, Bernhard Häupler, Tobias Janoschka and Ulrich S. Schubert, Chem. Rev. 2016, 116, 9438-9484. However, the use of the electrode according to the present invention is not restricted to the combined use as a cathode with the above-mentioned anode materials.

Moreover, the electrode according to the present invention can be used as anode, e.g. in energy storage devices with the following cathode materials consisting of lithium cobalt oxide (LCO), lithium nickel cobalt manganese (NMC, NCM), lithium manganese oxide spinel (LMS, LMO), lithium iron phosphate (LFP), lithium nickel cobalt aluminum oxide (NCA), lithium metal phosphates with manganese (LMnP), cobalt (LcoP), nickel (LNiP), manganese and iron (LMFP), lithium- and manganese-rich compounds such as LMNO, blends (mixtures different cathode materials), such as NMC with LFP or NMC with LMFP, metal fluorides (iron fluoride, copper fluoride, iron copper fluoride), vanadium oxide, metal sulfides, metal silicates, and sulfur. Other examples of cathode materials that can be used with our materials as an anode can be found in Simon Muench, Andreas Wild, Christian Friebe, Bernhard Häupler, Tobias Janoschka and Ulrich S. Schubert, Chem. Rev. 2016, 116, 9438-9484. However, the use of the electrode according to the present invention is not restricted to the combined use as an anode with the above-mentioned cathode materials.

In these primary or secondary electrochemical cells, many different electrolytes can be used in combination with the electrodes according to the present invention. Some examples of the electrolytes comprise non-aqueous electrolytes, organic solid electrolytes, or inorganic solid electrolyte as well as ionic liquids and crosslinkable ionic liquids.

The non-aqueous electrolytes may include, for example, an aprotic organic solvent, such as N-methyl-2-pyrrolidone, propylene carbonate, ethylene carbonate, butylene carbonate, dimethyl carbonate, diethyl carbonate, y-butyrolactone, 1,2-dimethoxy ethane, tetrahydrofuran, 2-methyl tetrahydrofuran, dimethyl sulfoxide, 1,3-dioxolane, formamide, dimethylformamide, dioxolane, acetonitrile, nitromethane, methyl formate, methyl acetate, phosphoric acid trimesters, trimethoxymethane, dioxolane derivatives, sulfolane, methyl sulfolane, 1,3-dimethyl-2-imidazolidinone, propylene carbonate derivatives, tetrahydrofuran derivatives, ether, methyl propionate, or ethyl propionate.

The organic solid electrolytes may include, for example, a polyethylene derivative, a polyethylene oxide derivative, a polypropylene oxide derivative, a phosphoric acid ester polymer, poly-agitation lysine, polyester sulfide, polyvinyl alcohol, polyvinylidene fluoride, or a polymer including an ionic dissociable group.

The inorganic solid electrolyte may include, for example, nitride, halide, or sulfate of lithium (Li), such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The ionic liquid electrolyte may include for example organic cationic compounds based on nitrogen-containing heterocyles such as Imidazol, Pyridine etc. in combination with inorganic anions such as $AlCl_4$, $BF_4$, $N(SO_2CF_3)_2^-$, $PF_6^-$, etc. these may also contain cross-linkable groups for subsequent polymeriziation/cross-linking.

Furthermore, the present invention also relates to an electrolytic capacitor, comprising the above-mentioned electrode, whereby the electrolytic capacitor is preferably selected from the group consisting of a supercapacitor (SC), a supercap, an ultracapacitor, and a goldcap.

II. Method of Preparation

Moreover, the present invention also relates to a method of the preparation of an electrode, preferably of the above-mentioned electrode. This method of preparation comprises the following process steps:
  a. spraying a cross-linkable monomer and/or oligomer, comprising at least one triaryl amine having at least one reactive polymerizable group, to provide an initial coating on an electro-conductive support material; and
  b. polymerizing the sprayed cross-linkable monomer or oligomer of the initial coating to provide a porous redox-active coating on the electro-conductive support material.

In the presently claimed method, the at least one triaryl amine having at least one reactive polymerizable group can be sprayed as a monomer or as an oligomer in step a. In the sense of the present invention, an oligomer is a molecular complex of triaryl amines having at least one reactive polymerizable group that consists of a few repeating units (triaryl amine having at least one reactive polymerizable group), in contrast to a polymer, where the number of monomers is, in principle, infinite. Examples are dimers, trimers, and tetramers of triaryl amines having at least one reactive polymerizable group.

The method of preparation according to the present invention produces the desired porosity in the at least one polymerized triaryl amine having at least one reactive polymerizable group based on a spray process.

The spray process can be done pneumatically, electrostatically or electrostatically with pneumatic assistance. In particular, the pneumatic processes can easily be scaled up to large areas and large volumes, which favors the technological feasibility for commercial applications. The spray method offers, compared to other methods, much wider possibilities than ever before to adjust the porosity with primary pores and secondary pores.

The desired porous structure is created by the gaps between the particles (=primary porosity) and by pores in the particles themselves (=secondary porosity). Due to the size and shape of the particles, the primary porosity can be varied. Adjustments in the spray process make it possible to tailor the size and shape of the particles obtained (spheres, spindle-shaped bodies, rods, fibers, smooth and curved platelets, as well as all the forms mentioned, which are connected to each other by fibers). By further adjustments in the spraying process, the above-mentioned secondary porosity can be produced in the resulting particles by evaporating the solvent out of the particles. Between smooth particles and porous particles, a wide range can be set.

Figure 4:
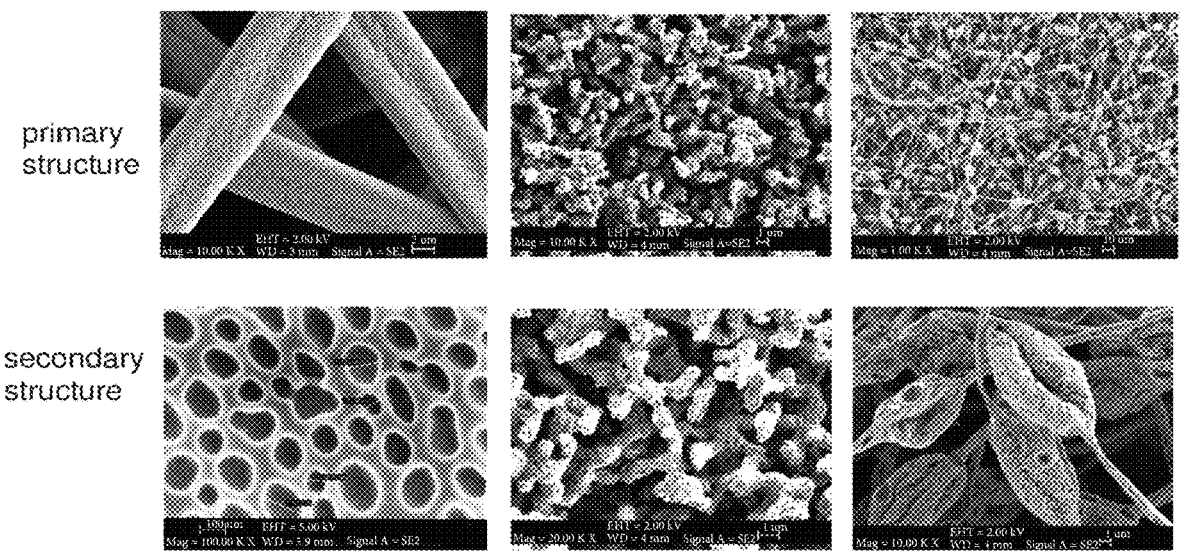
FIG. 4 shows SEM images of several different embodiments of porous structures that can be obtained via a process to spray as a monomer or an oligomer a triaryl amine having at least one reactive polymerizable group.

The spraying process used in the method according to the present invention is preferably adjusted in such a way that the porous particles remain isolated after the triaryl amine compound having at least one reactive polymerizable group has been deposited, but that the particles combine respectively sinter at their points of contact. This promotes the necessary charge transport between the different particles. The resulting porous structure is finally fixed and stabilized by crosslinking in step b. The SEM images in FIG. 4 show several different embodiments of porous structures that can be obtained via the spray process.

The method according to the present invention allows the creation of channels respectively pores in the resulting electrode material, into which the electrolyte solution (solvent and salt) can penetrate (first pores). The pores in the particles additionally have smaller substructures, which allow an even deeper penetration into the electrode and an even larger contact area with the electrolyte solution (second pores). The resulting relatively large surface allows faster charge exchange and, thus, faster charging and discharging. Moreover, the resulting relatively large surface has a positive effect on the achievable power density. With previously known techniques, the porosity of environmentally friendly polymer electrodes could by far not be sufficiently adjusted. After fixation of the structure by cross-linking, the material can be mechanically compacted as needed, e.g. by calendaring or pressing (in a further optional process step c.). The porous structure holds the electrolyte solution already by capillary forces. To increase the leakage safety even further, the electrolyte solution can also be crosslinked after penetration.

The method according to the present invention is preferably used for the preparation of an electrode which is described above. Thus, the claimed method intends in particular to the preparation of a cathode or an anode, whereby the preparation of a cathode is preferred.

In the claimed method, step a. is preferably carried out by spraying, pneumatic spray atomization, air brush spraying, aerosol jet spraying, airless spraying, electrostatic spraying, and pneumatic assisted electrostatic spraying of the cross-linkable monomer or oligomer.

In a preferred embodiment of the present invention, the cross-linkable monomer and/or oligomer is sprayed in step a. onto the electro-conductive support material in combination with one or more additives.

This additional at least one additive is preferably selected from the group consisting of non-redox active materials selected from the group consisting of polystyrene, PMMA, polyethylene, polypropylene, polyacrylonitrile, polyamide, polyester, polyurethane, from the group of redox-active materials selected from the group consisting of triarylamines as described in this patent, PVK, polyacrylonitrile, polyamide, polyester, polyurethane lithium cobalt oxide (LCO), lithium nickel cobalt manganese (NMC, NCM), lithium manganese oxide spinel (LMS, LMO), lithium iron phosphate (LFP), lithium nickel cobalt aluminum oxide (NCA), lithium metal phosphates with manganese (LMnP), cobalt (LcoP), nickel (LNiP), manganese and iron (LMFP), lithium- and manganese-rich compounds such as LMNO, blends (mixtures different cathode materials), such as NMC with LFP or NMC with LMFP, metal fluorides (iron fluoride, copper fluoride, iron copper fluoride), vanadium oxide, metal sulfides, metal silicates, and sulfur. Other examples of suitable materials can be found in Simon Muench, Andreas Wild, Christian Friebe, Bernhard Häupler, Tobias Janoschka and Ulrich S. Schubert, Chem. Rev. 2016, 116, 9438-9484, adhesion promotors, wetting promotors, self-assembled monolayer additives, oxetane- and epoxy resins.

Usually, the cross-linkable monomer and/or oligomer is sprayed in step a. onto the electro-conductive support material in a solvent and/or dispersing medium, whereby the solvent and/or dispersing medium may be composed of one solvent component or a mixture of two or more solvent components.

For electrostatic spraying it is in particular preferred that the solvent and/or dispersing medium is an electric conductive solvent to solve the triaryl amine having at least one reactive polymerizable group. According to Tang et al., Anal. Chem. 1991, 63, 23, 2709-2715 the electric conductivity of the solution should be at least $10^{-7}$ S*cm.

For other sorts of spraying the electric conductivity of the solvent is not critical.

Suitable solvents can be selected from the group consisting of, inter alia, chloroform, chlorobenzene, dichlorobenzene, trichlorobenzene, methanol, ethanol, propanol, isopropanol, DMF, DMSO, NMP, toluene, xylene, dichloromethane, acetonitrile, water and THF.

Usually, the cross-linkable monomer and/or oligomer is sprayed onto the electro-conductive support material in a solvent in step a. and thereafter the solvent is removed from the initial coating prior to step b. Thereby, the second pores are created.

The process parameters are used to control the porosity of the porous redox-active coating on the electro-conductive support material as described in the following:

The desired porous structure is created by the gaps between the particles (=primary porosity) and by pores in the particles themselves (=secondary porosity). Due to the size and shape of the particles, the size of the cavities between the particles and thus the primary porosity can be varied. Through adjustments in the spray process, the size and shape of the resulting particles can be targeted (spheres, spindle-shaped bodies, rods, fibers, smooth and curved platelets, as well as all the forms mentioned, which are interconnected by fibers).

The spraying process is adjusted in such a way that the porous particles remain isolated after the application and pores remain, but the particles combine respectively sinter at their points of contact. This promotes the necessary charge transport between the different particles. Setting parameters here are the spray rate, the distance between spray capillary and substrate to be coated, the volatility of the solvents used, as well as the control of the spraying atmosphere. The specific process parameters can easily be adjusted by the person skilled in the art using routine experiments.

The secondary porosity in the particles arises when solvent evaporates rapidly from the particles in which the material was not so soluble. Thus, this solvent is present in the particle as small droplets and it is assumed, without being bound by this theory, that this solvent leaves behind the pores during rapid evaporation. On the one hand, the porous particles must arrive so dry that the preformed particulate respectively porous structure does not run or float on the substrate, but on the other hand, the porous particles must be so moist that they adhere and bond at the contact points to the neighboring particle and also to the substrate. This is determined by the volatility of the solvent or solvent mixtures used and by the solvent content in the atmosphere and thus the evaporation rate.

In addition to the redox-active triarylamine, as the main components in the sprayed solution various additives are used. Thus, for example, polymeric additives promote the formation of fibrous structures (electrospinning);
by addition of low-boiling solvents the number and size of the secondary pores is adjusted,
by addition of non-solvents the redox-active material is partly precipitated in the formed spray droplets thus influencing the shape of the particles,
by adding conductive additives, the conductivity of the resulting electrode material is adjusted;
by adding conductive components to the spray solutions that promote the electrostatical atomization in the spray process.

In the case of non-polar solvents, conductive additives respectively solvents may be added (ethanol, methanol, isopropanol, acetonitrile, DMF, DMSO, acetic acid, formic acid, etc.). However, if the solution becomes too conductive (e.g., too many salts are present), electrostatic atomization may no longer occur, and nonpolar and less conductive solvents must be added.

Polar solvents such as alcohols (methanol, ethanol) or water have higher conductivity than ethers (e.g., tetrahydrofuran). However, even with polar solvents, the main part of the conductivity is due to the impurities usually contained therein. Extremely pure solvents, which are used, for example, in semiconductor technology may be used regardless of whether polar or nonpolar. In the case of reagent grade methanol, on the other hand, the conductivity of the salts contained therein is sufficient to produce a very fine and efficient electrospray. Optimum conductivities that enable a fine and stable electrospray are around $10^{-4}$ to $10^{-2}$ S/m, which can also be achieved with additives such as electrolytes (salts, but also acids such as acetic acid or formic acid or bases). Likewise, conductive electrolytes come into consideration as they are also used in electrochemistry. If a non-volatile additive, such as a salt, is used, this must be chosen so that it does not affect the function of the layer formed, because it will remain in the layer. When volatile additives are used, such as acetic acid or formic acid, they do not remain completely in the coating, but it must be ensured that it does not lead to unwanted chemical reactions between additive and coating substance in the solution.

If the atomization cannot take place well, the resulting drops and thus the resulting particles become too large. Here to find an ideal interaction of all necessary factors is preferred. Other additives may also have an impact, such as the addition of polymerization initiators (for example photoinitiators) to initiate and cure the structure after deposition.

The composition of the solution which is sprayed may be selected to evaporate the solvent while spraying to cause flocculation of the organic molecule and deposition in a semi-dry state. The organic material will become sufficiently solidified in order not to deliquesce while being deposited. On the other hand, the organic material is not dry enough to crumble without having achieved adhesion between individual particles. Then a morphology will result which will show a porous structure.

Depending on the desired morphology of the layer the composition of the solution which is sprayed on may be selected such that the solvent will not evaporate before the spraying procedure, and only the organic material already present in the drop formed will flocculate and will be deposited in a semi-dry state. Then, the organic material will be present in the form of extremely small particles when being deposited. A morphology of the layer showing extremely small pores a will result. In one embodiment of the invention the surface onto which the coating material is to be applied is set to an electric potential which will have an attractive effect on the charged solution to be atomized, thereby reducing the losses of material caused by spraying beyond the surface.

In one embodiment of the invention the surface onto which the coating material of the layer is to be applied becomes electrically charged, and oppositely to the liquid to be atomized. The electrically oppositely charged solution will thus be directed towards the surface which is to be coated with the organic material. Losses of material will thus be reduced.

In order to further minimize losses of materials in one embodiment the solution to be sprayed on becomes electrically charged and the spray cloud developing during spraying is formed by additional electrostatic and/or magnetic fields.

In another embodiment gas streams are used to form the spray cloud.

In another embodiment gas streams are used to influence the evaporation of the solvent in the spray cloud.

In another embodiment the gas streams for influencing the evaporation of the solvent in the spray cloud can be heated.

In another embodiment gas streams around the capillary are used to atomize the liquid.

In another embodiment of the Invention the solution wherein the organic material is contained is atomized through a capillary or a nozzle. The distance between the capillary and the nozzle, respectively, and the surface to be coated will be changed during deposition procedure. At small distance rather wet organic particle will meet the surface to be coated, at large distance rather dry organic particles will meet the surface to be coated. If the first coats are applied with lower distance between the surface and capillary and the subsequent coats will be applied with a large distance between surface and capillary, respectively, By doing so, first a more compact layer having extremely good adhesion and conductive attachment to the surface area to be sprayed onto is created, followed by the porous interlayer into which the electrolyte solution can easily penetrate.

In another embodiment the solvent composition is initially selected to create a more compact layer having extremely good adhesion and conductive attachment to the surface area to be sprayed onto, followed by use of a composition of the solution which will produce a porous layer having into which the electrolyte solution can easily penetrate.

In another embodiment the temperature and/or the solvent content of the atmosphere in which spraying is performed are varied to result in analogy to the above, layers will which have varying porosity. Thus for example a more compact layer initially develops in order to achieve good adhesion to the bottom layer, followed by a gradual transition into porous layers.

The various methods for producing compact and porous layers may be combined with each other in any desired way.

A subsequent cross linking of the layers thus produced will increase the mechanical stability and load-bearing capacity, which will be of advantage for a subsequent practical application.

In one embodiment the sprayed-on organic material is cross linked in order to stabilize the layer on the one hand and on the other hand increase the (electrical) conductivity.

In the following, some process parameters to control the primary and secondary porosity are summarized.

Thus, to summarize the solvent is preferably selected to control the porosity of the porous redox-active coating on the electro-conductive support material.

To summarize further, the removal of the solvent from the initial coating is preferably carried out under conditions to control the porosity of the porous redox-active coating on the electro-conductive support material.

To summarize further, the distance between the spray device and the electro-conductive support material is preferably used to control the porosity of the porous redox-active coating on the electro-conductive support material.

To summarize further, the spray device is preferably constituted by a spray capillary.

To summarize further, the temperature of step a. is preferably used to control the porosity of the porous redox-active coating on the electro-conductive support material.

To summarize further, the cross-linkable monomer and/or oligomer, comprising at least one triaryl amine compound having at least one reactive polymerizable group, is preferably selected to control the porosity of the porous redox-active coating on the electro-conductive support material.

To summarize further, the cross-linkable monomer and/or oligomer, comprising at least one triaryl amine compound having at least one reactive polymerizable group, is preferably selected with regard to the bendability, extensibility, glass transition temperature, viscosity and morphology of the resulting porous redox-active coating on the electro-conductive support material.

To summarize further the polymerization in step b. is caused by initiators which are part of the spray material, provided on the electro-conductive support material prior to coating and/or provided on the electro-conductive support material after coating. The degree of polymerization and thus the density of the resulting polymer network can be adjusted. The aim is to achieve a network density that is strong enough to maintain the porous structure, that is permeable enough to let ions penetrate deep into the material and that is flexible enough to compensate for volume changes due to incorporation or release of ions during charging and discharging. In all cases the initiator may be solid, liquid, or gaseous. Thereby, the initiator is preferably selected to initiate a polymerization of the cross-linkable moiety of the triaryl amine compound.

Preferred cross linkable groups of the triaryl amine compound.are oxetane and epoxy groups, that can be cross-linked via cationic polymerization.

For cationic polymerization, photoinitiators, superacids, reactive species such as plasma, etc., all of which are Lewis and Broensted acids in a broader sense, OPPI, trityl cations, NO+BF$_3$, AlCl$_3$, perchloric acid, trifluorosulfonic acid, trifluoroacetic acid, HCl, H$_2$SO$_4$, H$_3$PO$_4$ etc. can be used.

For anionic polymerization, Li organyls (e.g., butyl-lithium), and Grignard compounds can be used.

For radical polymerization, azo compounds (e.g., azobis (isobutyronitrile)), peroxides (e.g., dibenzoyl peroxide, peroxodisulfates, di-(2-ethylhexyl) peroxydicarbonate, methyl ethyl ketone peroxide, etc. can be used.

Also polycondensation or polyaddition are conceivable.

In a further step c. of the claimed method, a further lithographic step might be applied on the porous redox-active coating. Thus, the electrode may be structured after coating.

The cross-linkable triarylamines are usually not yet cross-linked on encountering the sprayed particles on the substrate (or only very slightly by charging in the electrostatic spraying process). If the deposited particulate layer containing a photoinitiator (already added before spraying or on the spray pad present or added by gas phase or solution to the spray position) are exposed through a mask by activation light, only at the exposed areas the layer is fixed by crosslinking. The unexposed part can then be washed off (not crosslinked) or melted together by annealing. This results in areas on the substrate, which are coated with the porous material, while other areas are free or contain a compact layer.

Thus, in a further embodiment of the present invention, the claimed method is characterized in that the electrode is structured after coating by a coating provided on the porous redox-active coating.

The triaryl amine used in the claimed method having at least one reactive polymerizable group is preferably a compound of the following general formula (I)

(I)

whereby
R$^1$, R$^2$, R$^3$ are optionally substituted phenyl rings,
R$^1$ and R$^2$ may be linked together;
at least one of R$^1$, R$^2$, R$^3$ is substituted by R$^{4'}$,
whereby
R$^{4'}$ is selected from:

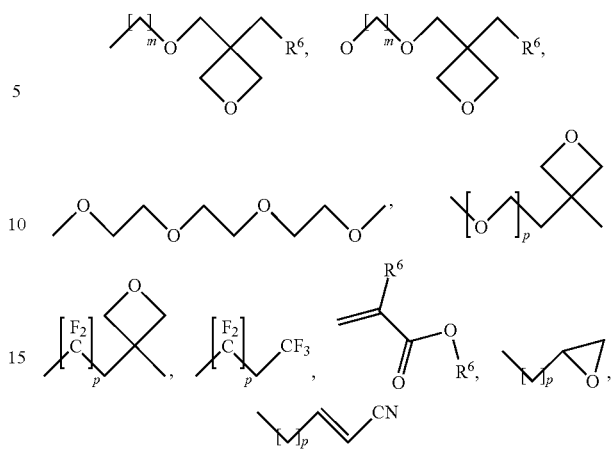

wherein m is integer of 1 to 8, p is an integer of 0 to 8; and

R$^6$ is selected from H, F, Cl, Br, I, CN, CF$_3$, (CF$_2$)$_n$CF$_3$, CCl$_3$, Cl$_3$, CBr$_3$, SO$_3$Na, SO$_3$K, SO$_3$Li, SO$_3$H, NH$_2$, NO$_2$, NHR, NR$_2$, Me, (CH$_2$)$_n$Me, Ar, O(CH$_2$)$_n$Me, OH, OMe, O(CH$_2$O)$_{n'}$, OAr, O(CH$_2$)$_n$Me, COOH, COOMe, COO(CH$_2$)$_n$Me, COOAr, MeO and whereby n' is an integer of 0 to 6.

In a first specific embodiment of the present invention, the triaryl amine having at least one reactive polymerizable group is preferably a dimer triaryl amine covered by the general structure (II) below:

(II)

wherein R$^1$, R$^2$ are optionally substituted phenyl rings;

R$^1$ and R$^2$ may be linked together; and

R$^3$ is a bi- or trivalent optionally substituted phenyl ring.

In this first specific embodiment of the present invention, at least one of R$^1$, R$^2$, R$^3$ is substituted by R$^{4'}$ R$^3$ is preferably a bi- or trivalent optionally substituted phenyl ring selected from the following groups:

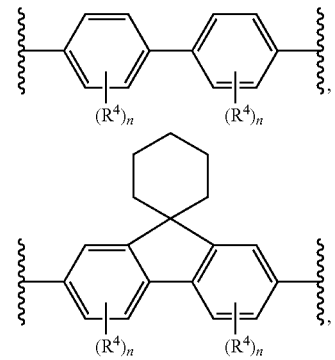

-continued

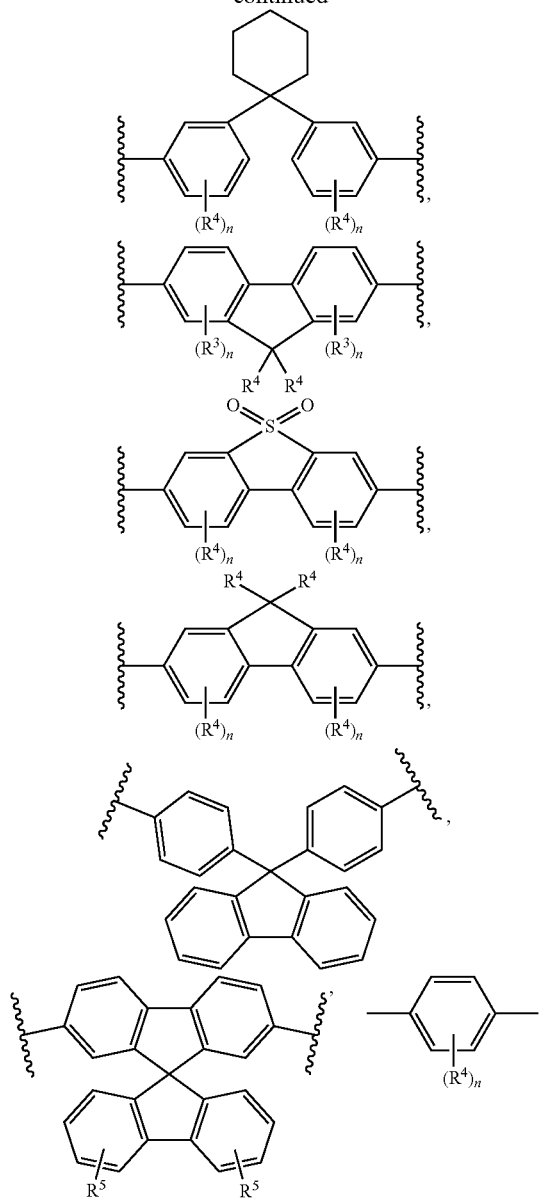

wherein R⁴ is selected from:
H, F, Cl, Br, I, CN, CF₃, (CF₂)ₙCF₃, CCl₃, Cl₃, CBr₃, SO₃Na, SO₃K, SO₃Li, SO₃H, NH₂, NO₂, NHR, NR₂, Me, (CH₂)ₙMe, Ar, O(CH₂)ₙMe, OH, OMe, O(CH₂O)ₙ, OAr, O(CH₂)ₙMe, COOH, COOMe, COO(CH₂)ₙMe, COOAr, MeO or R⁴' and whereby n' is an integer of 0 to 6,
whereby R⁴' is selected from

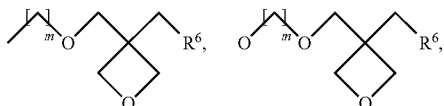

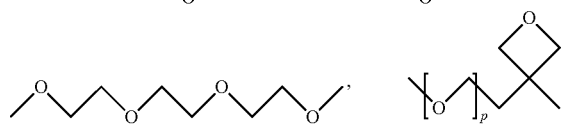

-continued

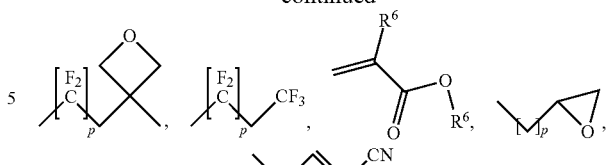

wherein R⁵ is

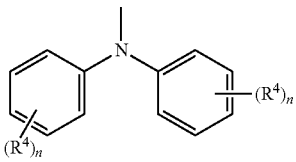

and
whereby at least one of R⁴ might be R⁴',
wherein n is an integer of 0 to 5 and m is an integer of 1 to 8.

In a second specific embodiment of the present invention, the triaryl amine having at least one reactive polymerizable group is preferably a monomer triaryl amine covered by the general structure (III) below:

$$\begin{array}{c} R^1 \\ | \\ N-R^{3'} \\ | \\ R^2 \end{array} \qquad (III)$$

whereby
R¹, R² are optionally substituted phenyl rings;
R¹ and R² may be linked together; and
R³' is a compound with the general structure

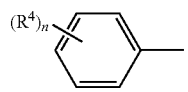

n is an integer of 0 to 4 and
R⁴ is selected from the group consisting of H, F, Cl, Br, I, CN, CF₃, (CF₂)ₙCF₃, CCl₃, Cl₃, CBr₃, SO₃Na, SO₃K, SO₃Li, SO₃H, NH₂, NO₂, NHR, NR₂, Me, (CH₂)ₙMe, Ar, O(CH₂)ₙMe, OH, OMe, O(CH₂O)ₙ, OAr, O(CH₂)ₙMe, COOH, COOMe, COO(CH₂)ₙMe, COOAr, MeO and R⁴',
n' is an integer of 0 to 6,
whereby R⁴' is selected from

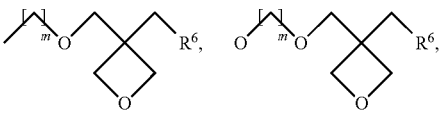

-continued

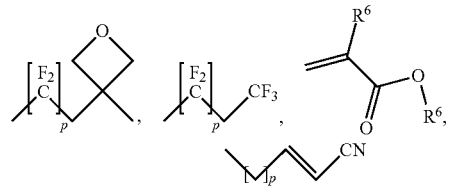

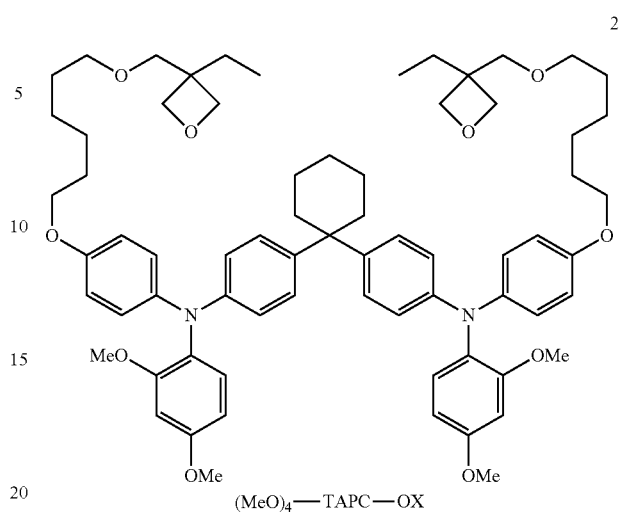

(MeO)$_4$—TAPC—OX wherein m is an integer of 1 to 8; and p is an integer of 0 to 8; and $R^6$ is selected from H, F, Cl, Br, I, CN, CF$_3$, (CF$_2$)$_n$CF$_3$, CCl$_3$, Cl$_3$, CBr$_3$, SO$_3$,Na, SO$_3$K, SO$_3$Li, SO$_3$H, NH$_2$, NO$_2$, NHR, NR$_2$, Me, (CH$_2$)$_n$Me, Ar, O(CH$_2$)$_n$Me, OH, OMe, O(CH$_2$O)$_n$, OAr, O(CH$_2$)$_n$Me, COOH, COOMe, COO(CH$_2$)$_n$Me, COOAr, MeO, whereby n' is an integer of 0 to 6.

In both embodiments, the first and the second embodiment, the triaryl amine having at least one reactive polymerizable group is a compound of the following general formula (I)

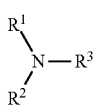 (I)

$R^1$ and $R^2$ are preferably

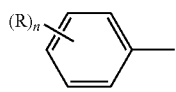

which may be linked together; and and whereby n is an integer of 0 to 4 and R is selected from the substituents of $R^4$ and $R^{4'}$.

In the following, specific examples of the compound according to formula (I), (II), and/or (III) are shown:

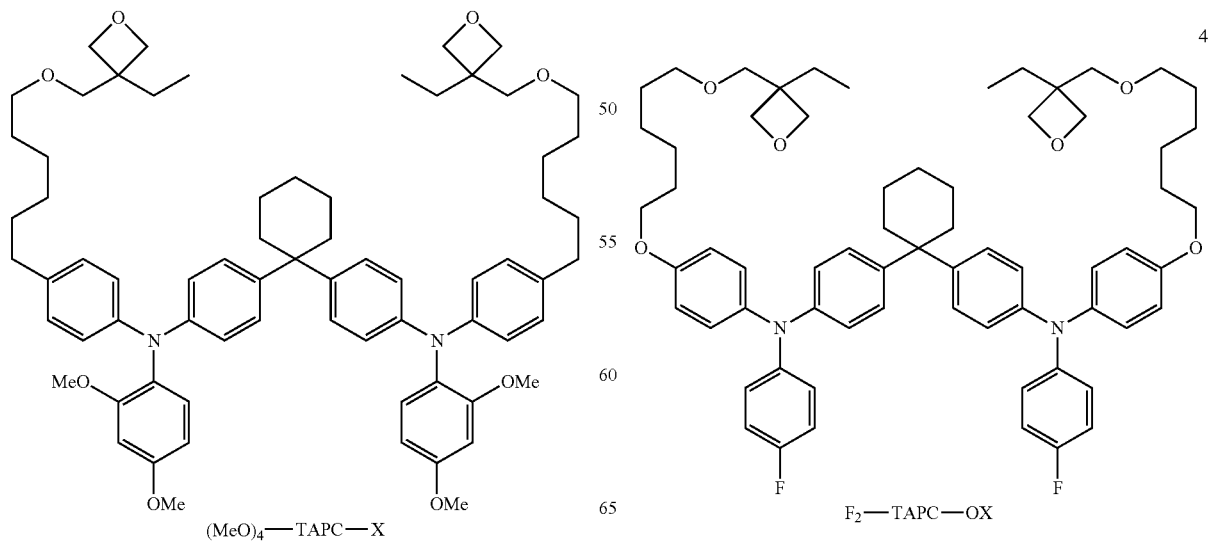

(MeO)$_4$—TAPC—X

F$_2$—TAPC—OX

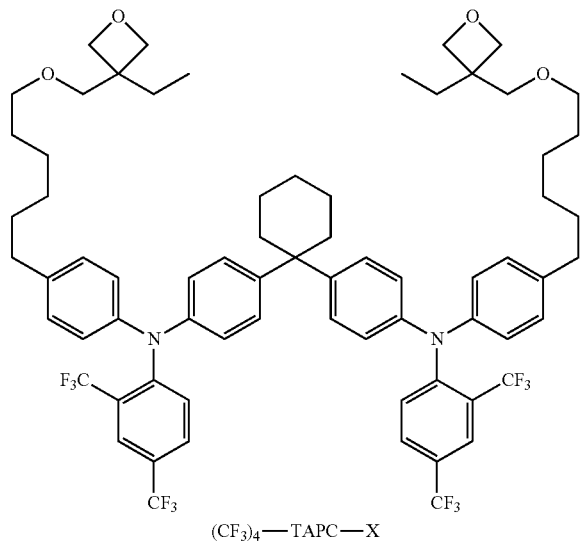
(CF₃)₄—TAPC—X
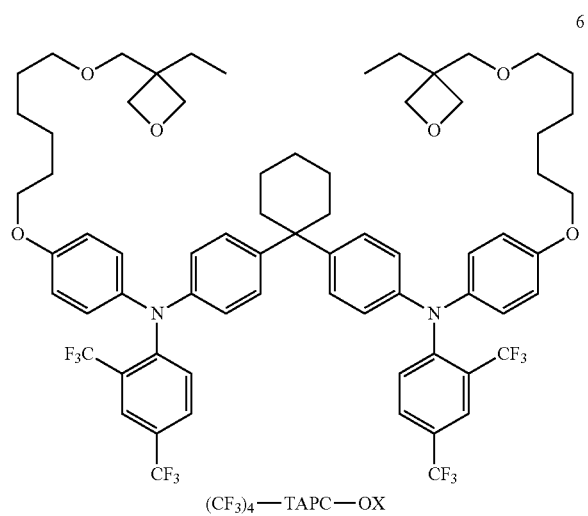
(CF₃)₄—TAPC—OX
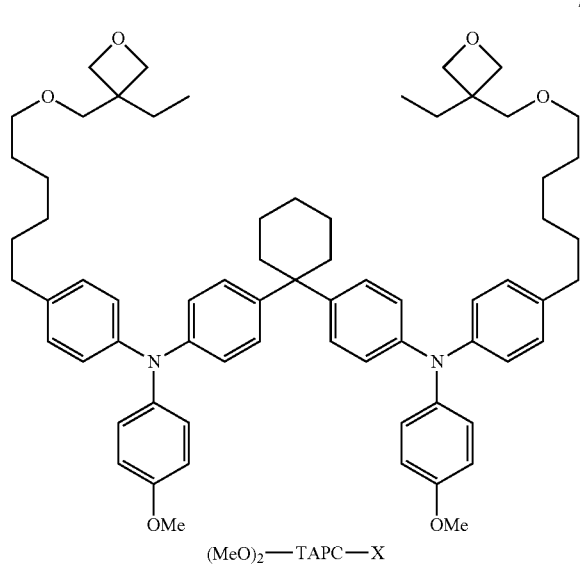
(MeO)₂—TAPC—X
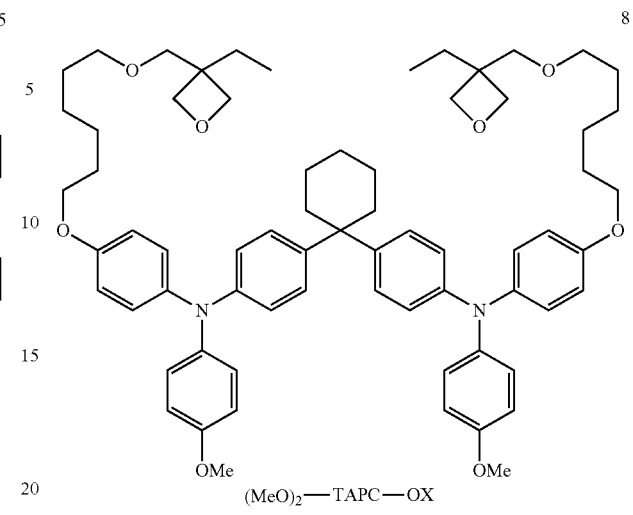
(MeO)₂—TAPC—OX
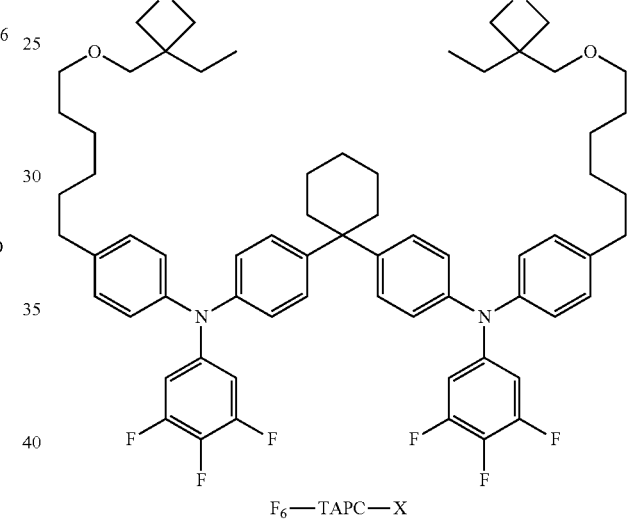
F₆—TAPC—X
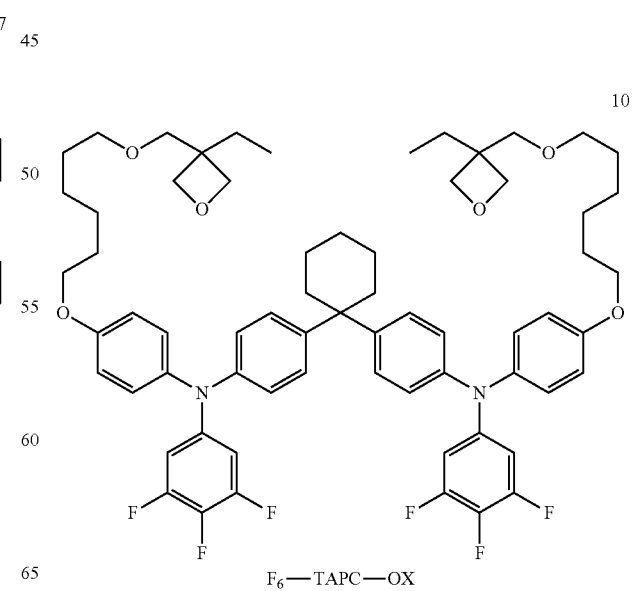
F₆—TAPC—OX -continued
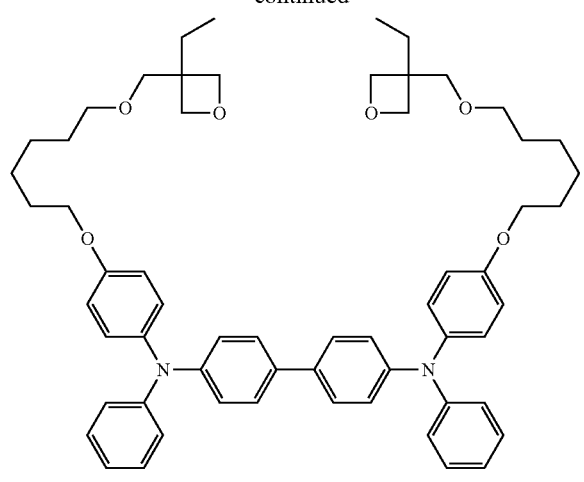
AUPD
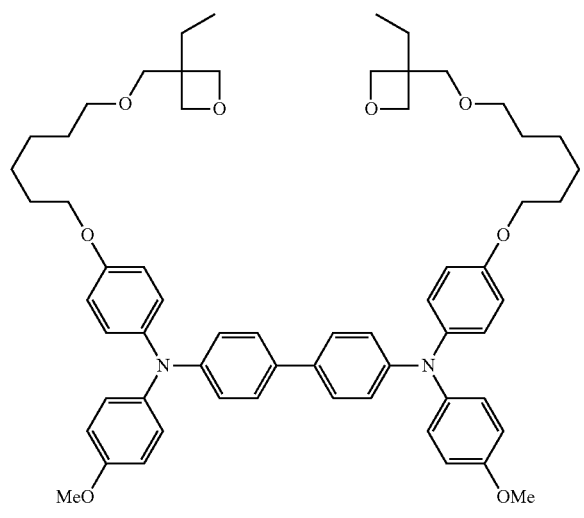
QUPD
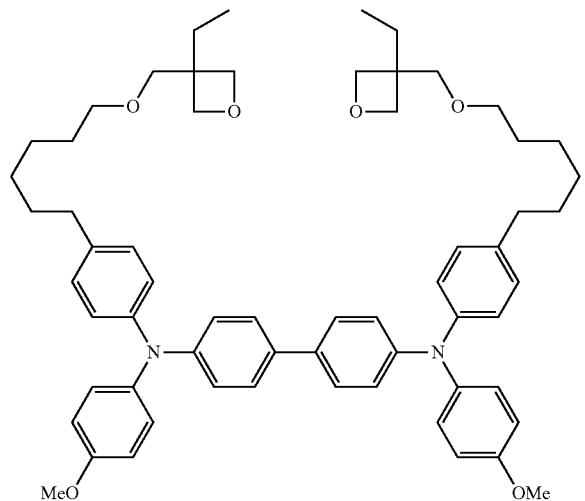
MUPD
-continued
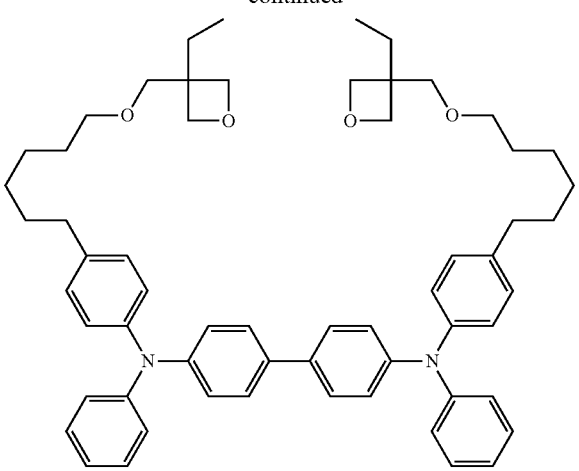
OTPD
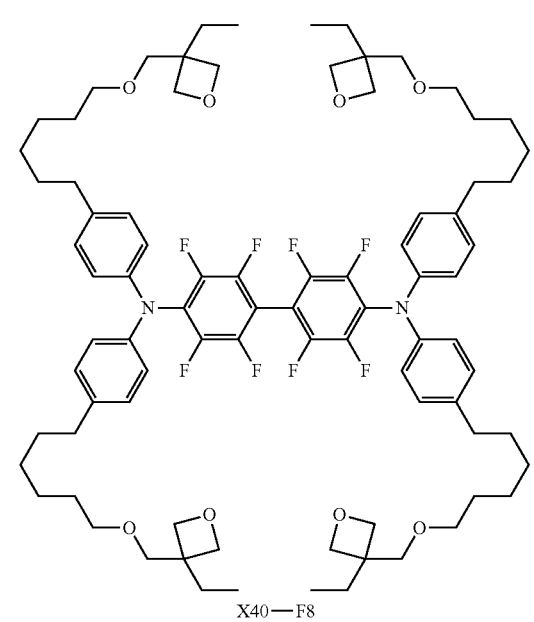
X40—F8

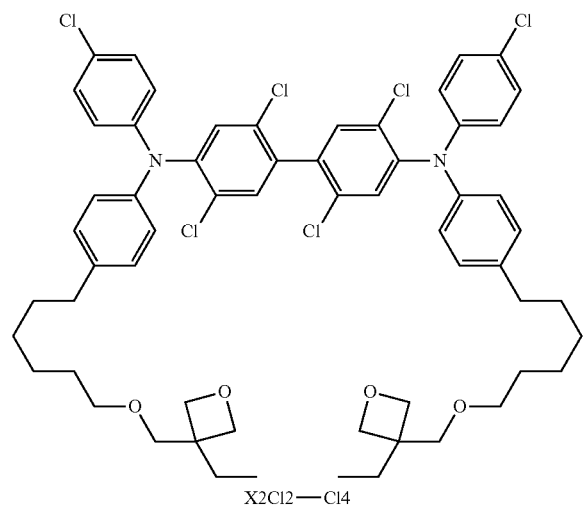
X2Cl2—Cl4
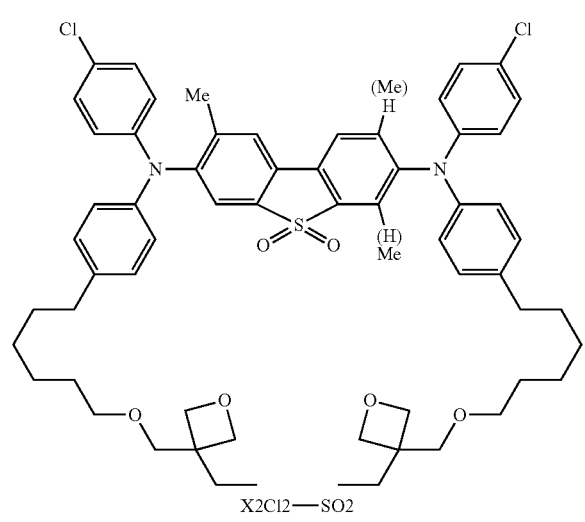
X2Cl2—SO2
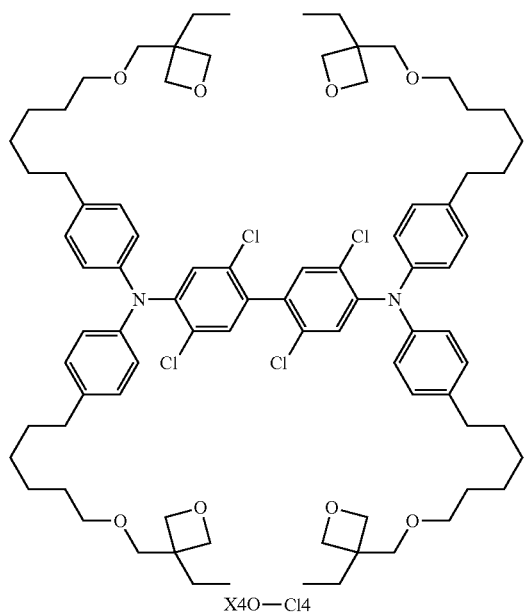
X4O—Cl4
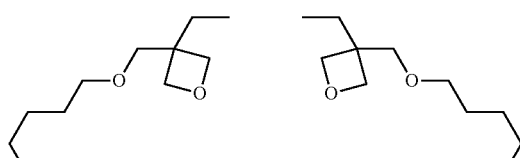
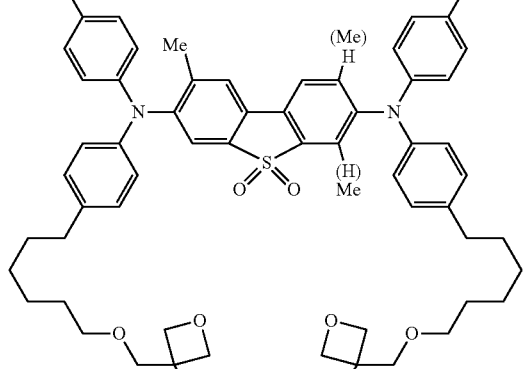
X4O—SO4
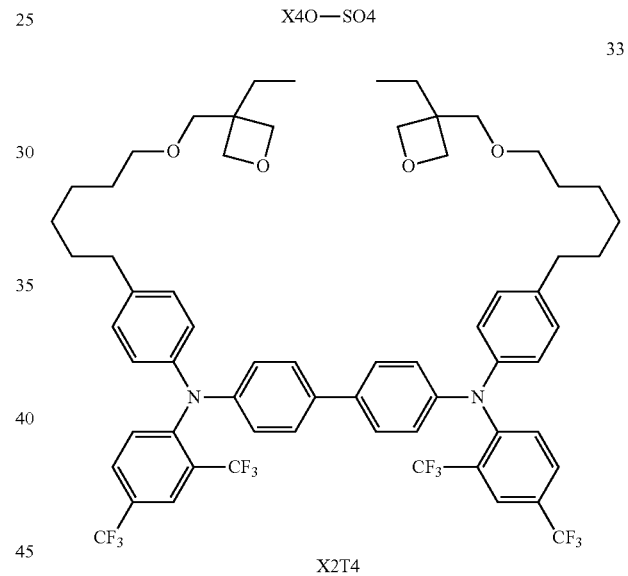
X2T4
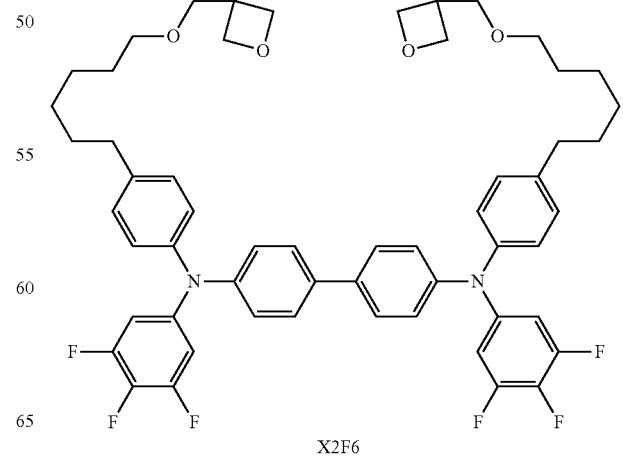
X2F6

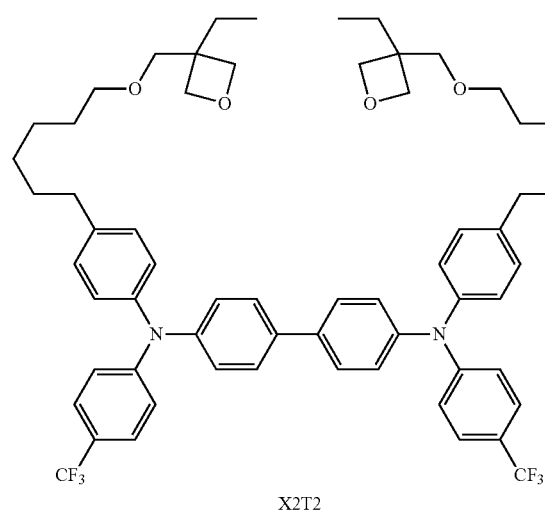
X2T2
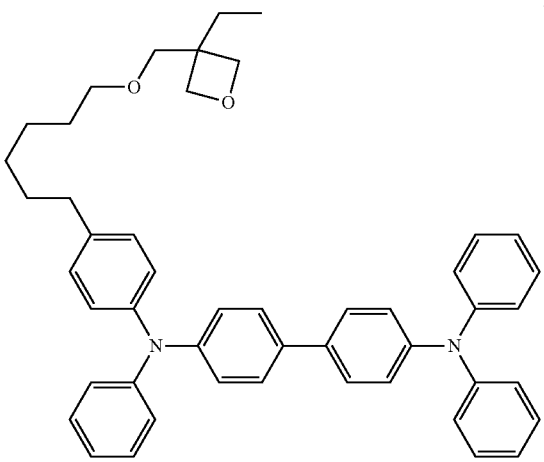
X1O
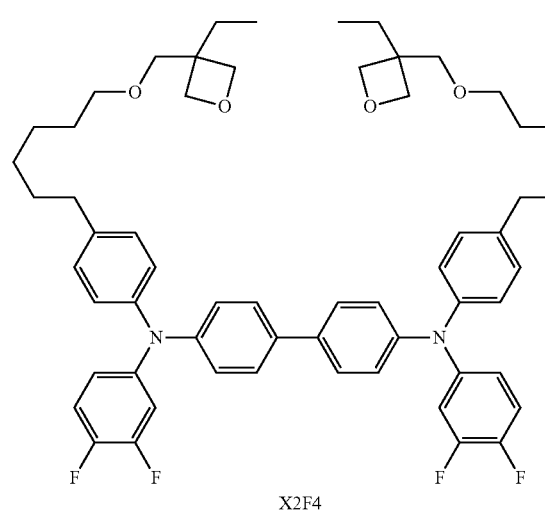
X2F4
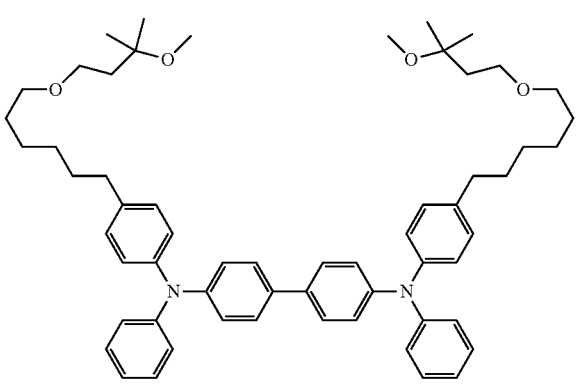
Y2O
(NOTPD)
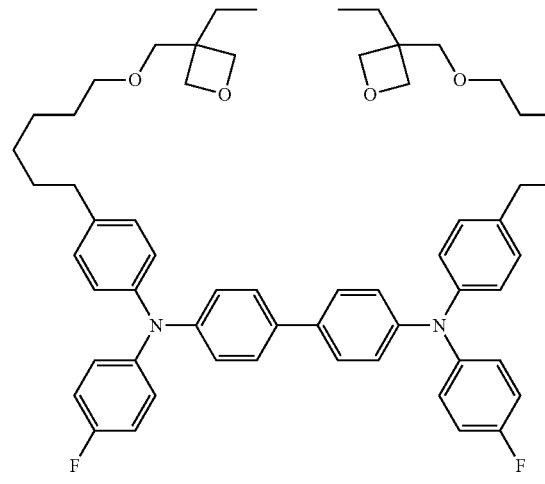
X2F2
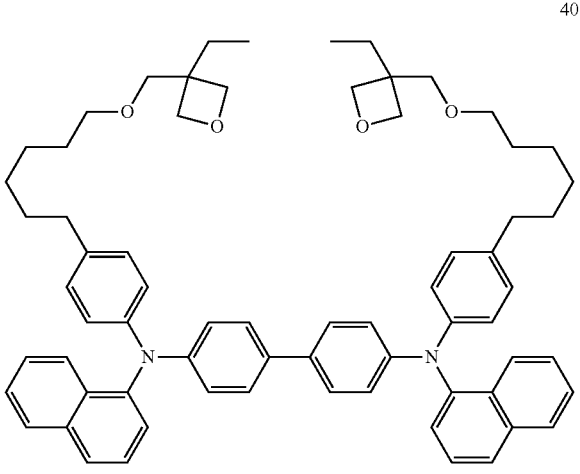
X2OαNa

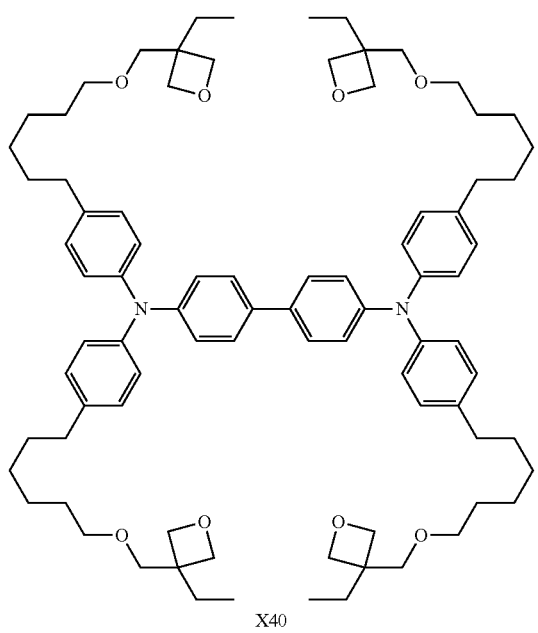
X40
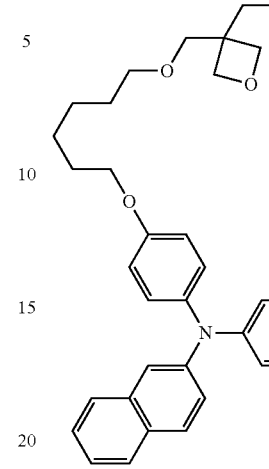
X2BM
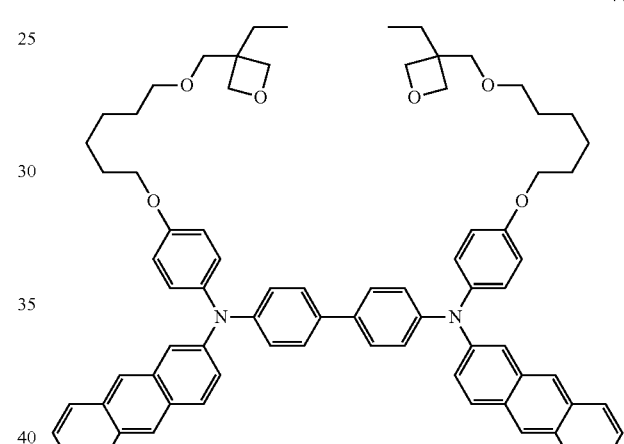
X2AβNa
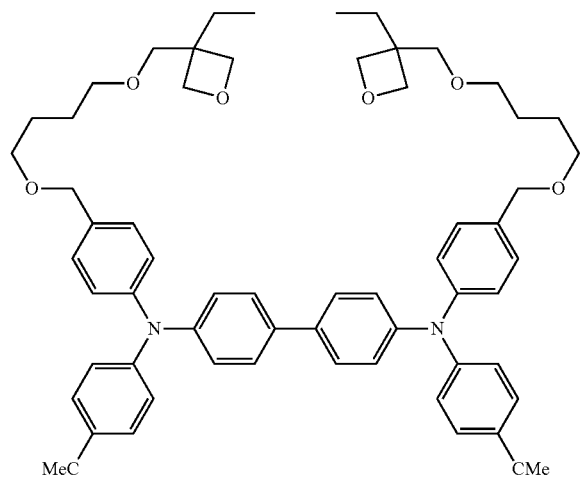
X2AAnt
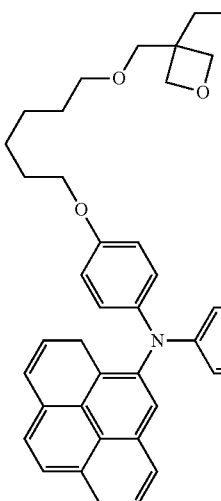
X2APy -continued

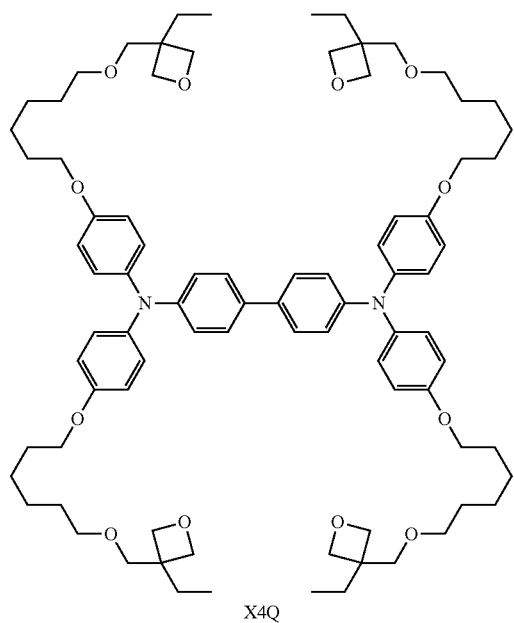

X4Q

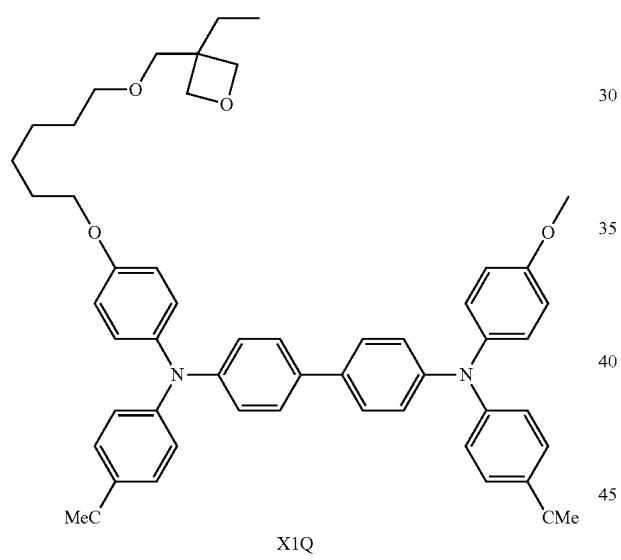

X1Q

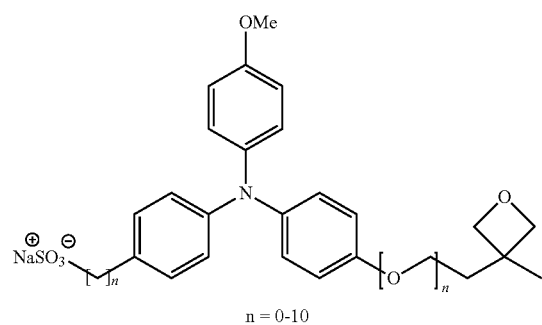

n = 0-10

The present invention is explained in more detail by referring to the following examples:

EXAMPLE 1

Three electrode materials according to the present invention are prepared which are shown in FIG. 4. This FIG. 4 shows:

Fibers with Pores (Left):
  (15% by weight OTPD, 5% by weight MeO-TPD+5% by weight polystyrene in THF):initiator solution 1 (10:1)
  Voltage between spray capillary and target: V=9.4 kV
  Distance spray capillary target: 9 cm
  Target=ITO glass
  Spray current: I=0.06-0.09 A
  Flow rate: 4 µl/min
  In ambient air
  Cross-linking by exposure with 320-360 nm UV lamp for 1 min, then annealed at 120° C. for 1 min Fibers with Beads (Middle):
  (10% by weight OTPD, 5% by weight MeO-TPD+5% by weight polystyrene in THF):initiator solution 1 (10:1)
  Voltage between spray capillary and target: V=9.4 kV
  Distance spray capillary target: 14.5 cm
  Target=ITO glass
  Spray current: I=0.06-0.09 A
  Flow rate: 5 µl/min
  In ambient air
  Cross-linking by exposure with 320-360 nm UV lamp for 1 min, then annealed at 120° C. for 1 min Porous "Coral" Structure (Right):
  (40 mg/ml QUPD+20 mg/ml battery foot in THF)
  Voltage between spray capillary and target: V=8 kV
  Distance spray capillary target: 10 cm
  Target=ITO glass
  Spray current: I=0.06-0.09 A
  Flow rate: 5 µl/min
  In ambient air
  Crosslinking after deposition in p-toluenesulfonic acid vapor for 30 sec.
  3×rinsed with dist. H$_2$O, then dried in a vacuum oven for 2 h In this FIG. 4, the following abbreviations are used:
OTPD=N,N'-bis (4-(6-((3-ethyloxetan-3-yl) methoxy) hexyl) phenyl)-N,N'-diphenylbiphenyl-4,4'-diamine
QUPD=N,N'-bis (4-(6-((3-ethyloxetan-3yl) methoxy) hexyloxy) phenyl)-N,N'-bis (4-methoxyph

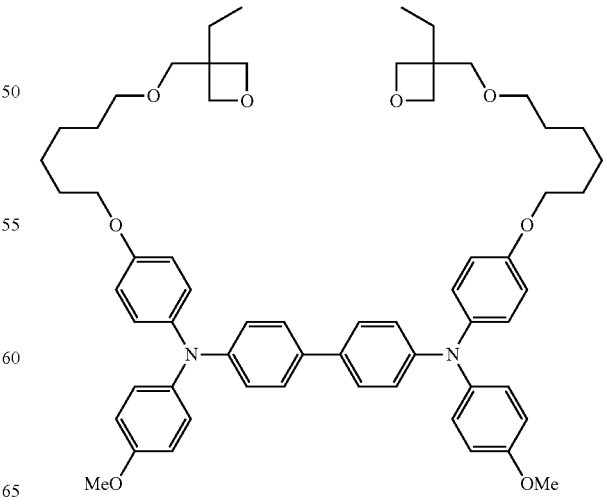

QUPD

-continued

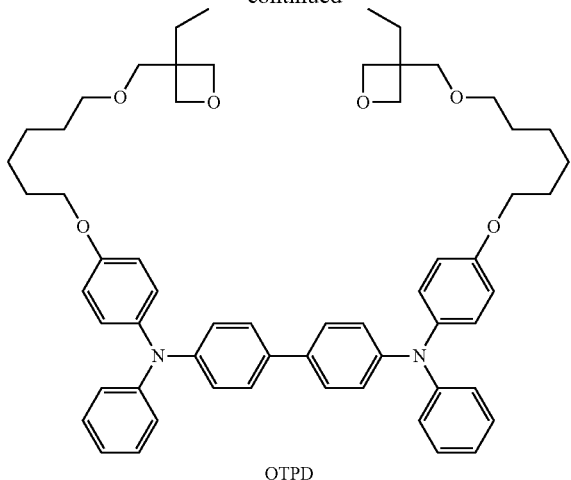

OTPD

Figure 5A:
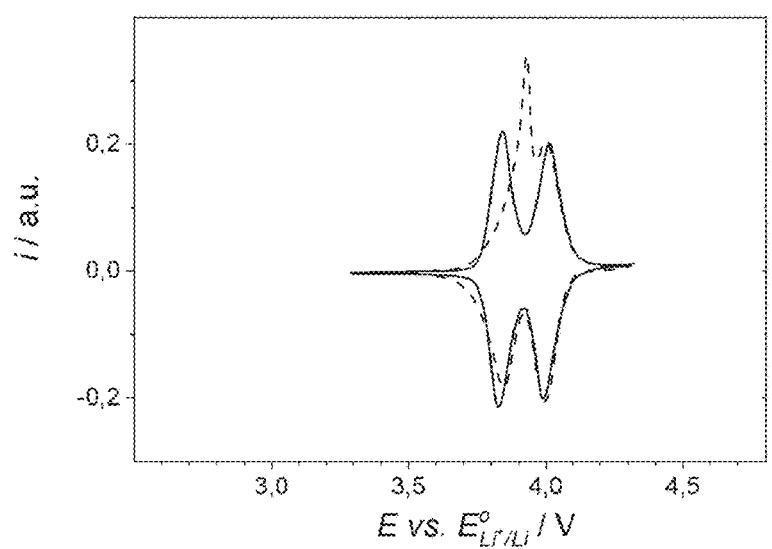
FIG. 5a shows a cyclic voltammogramme of a 100 nanometer compact layer of a crosslinked triarylamine dimer, according to an embodiment.

Initiatiator solution 1=10 mg/ml OPPI in toluene
OPPI=4-Octyloxydiphenyliodoniumhexafluorantimonat FIG. 5a shows the cyclic voltammogramme of a thin (100 nm) compact layer of a crosslinked triarylamine dimer (QUPD). Under these conditions, the material can be charged up to the theoretically calculated capacity, the discharge occurs without kinetic inhibitions, so that the potentials for charging and discharging are the same and the cyclic voltammogramme (at least in an "ideal" solvent) shows no hysteresis. This is an "ideal" case where all the redox units in the layer contribute to charge storage and the extracted power is maximum. The maximum with this material achievable capacity is 56 mA h g$^{-1}$, i.e. about ⅓ of the achievable capacity of classical Li-cathode materials (LFP, NMC: 168 or 160 mA h g$^{-1}$). The potential vs. Li/Li$^+$ is at 3.8V as in NMC.

If one tries to increase the capacity simply by increasing the layer thickness/amount of material, one can see in an approximately 50 microns thick compact layer (FIG. 5b black line) of the same redox-active material (QUPD+30% carbon black as an additive), that the charging and discharging of the redox-units located deeper in the layer is kinetically strongly inhibited. It is difficult for the electrolyte ions to reach these redox-sites, and there is a strong hysteresis that results in power loss in a battery.

Figure 5B:
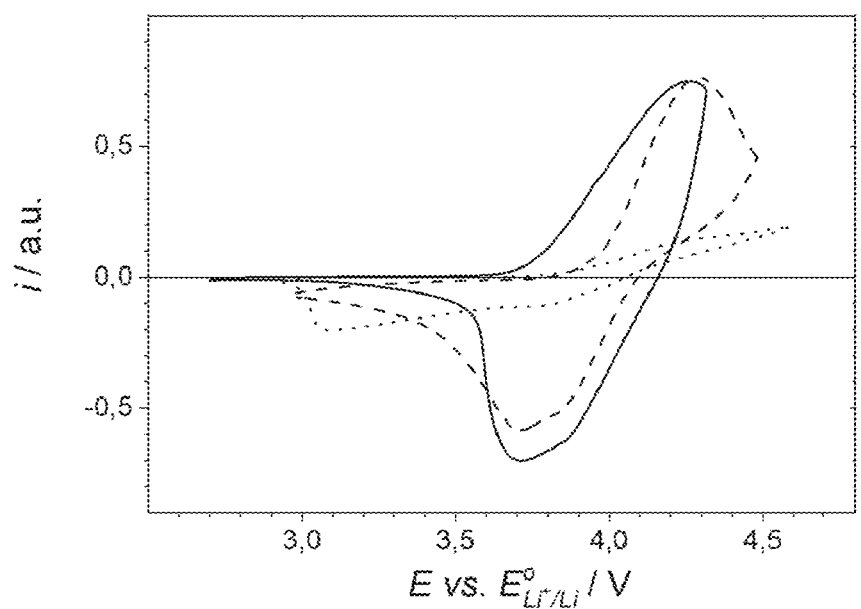
FIG. 5b shows a cyclic voltammogramme of a 50 micrometer compact layer of a crosslinked triarylamine dimer, according to an embodiment.

The CV of a layer of the same material and the same amount of material (QUPD+30% carbon black as an additive), which has received a porous structure by spraying, shows a significant improvement, since the charging and discharging of the porous layer is kinetically less inhibited due to the larger surface (FIG. 5b dashed line). If one now introduces the porosity according to the invention with a bimodal distribution in the same amount of redox-active material (QUPD+30% carbon black as an additive), it is observed that the CV already comes much closer to the "ideal" (FIG. 5b continuous line). FIG. 5c shows a series of charge and discharge cycles of this electrode. Typical of this material mixture is that the redox capacity initially increases over the first approximately 15 cycles ("burn-in") and then remains constant. So far, 50 cycles (2C) have been measured without a loss of capacity.

To summarize

Figure 5B:
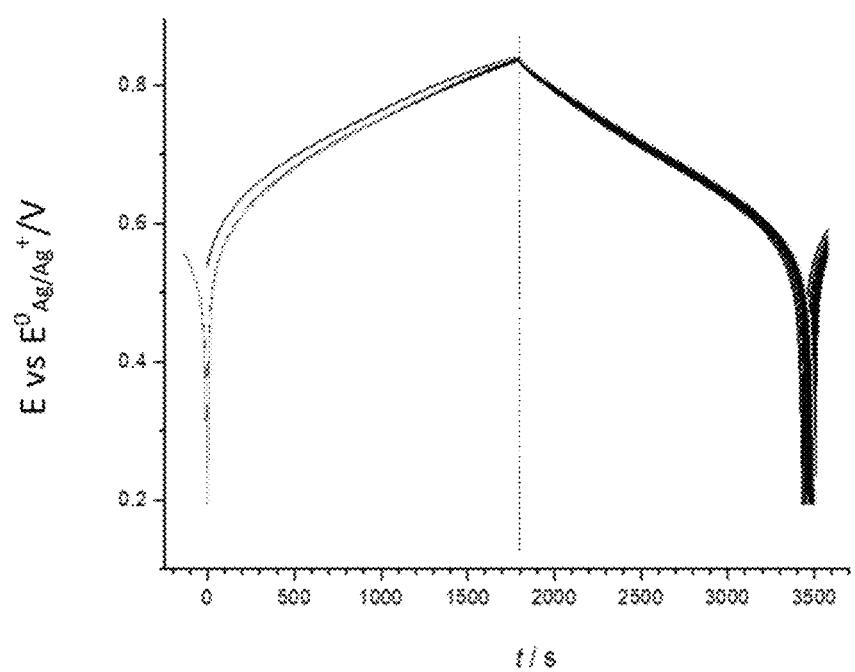

FIG. 5 a): "ideal" CVs (without additives) of a 100 nm film in CH$_2$Cl$_2$/TBAPF$_6$ (continuous line) and in PC/TBAPF$_6$ (dashed line);

FIG. 5 b): CVs in PC/TBAPF$_6$ of a >50 µm thick QUPD film mixed with about 30% carbon black; compact film (dotted line), porous film (dashed line), porous film with bi-modal pore distribution (continuous line).

FIG. 5 c): 50 charging and discharging cycles (2C) of a >50 µm thick, with about 30% carbon offset QUPD film with bi-modal pore distribution in PC/TBAPF$_6$.

The invention claimed is:

1. An electrode comprising:
    an organic compound prepared by polymerization of a triaryl amine, the triaryl amine having at least one reactive polymerizable group, at least a part of aryl moieties of the triaryl amine being non-conjugately connected to each other,
    the organic compound provided as particles or platelets, and
    the organic compound having at least a bimodal pore size distribution constituted by at least first pores of a size of 0.5 to 8 micrometers and second pores of a size of 20 to 250 nanometers.

2. The electrode according to claim 1, wherein the triaryl amine having at least one reactive polymerizable group is a compound of the following general formula (I):

wherein R$^1$, R$^2$, R$^3$ are optionally substituted phenyl rings, R$^1$ and R$^2$ are configured to be linked together, and at least one of R$^1$, R$^2$, R$^3$ is substituted by R$^{4'}$, wherein R$^{4'}$ is selected from:

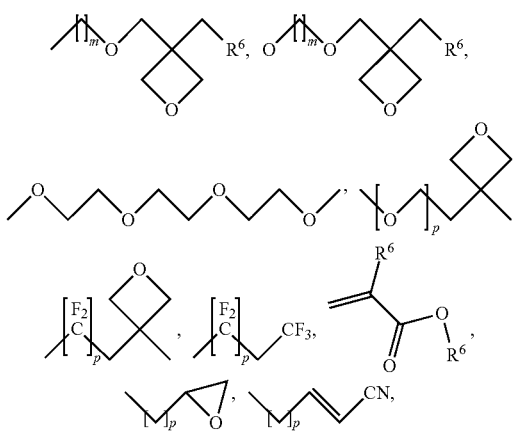

wherein m is an integer of 1 to 8, p is an integer of 0 to 8, and R$^6$ is selected from H, F, Cl, Br, I, CN, CF$_3$, (CF$_2$)$_n$'CF$_3$, CCl$_3$, CI$_3$, CBr$_3$, SO$_3$, Na, SO$_3$K, SO$_3$Li, SO$_3$H, phosphate, acetate, NH$_2$, NO$_2$, NHR, NR$_2$, Me, (CH$_2$)$_n$Me, Ar, O(CH$_2$)$_n$Me, OH, OMe, O(CH$_2$O)$_n$', OAr, O(CH$_2$)$_n$Me, COOH, COOMe, COO(CH$_2$)$_n$Me, COOAr, and MeO,
wherein n'=0-6.

3. The electrode according to claim 1, further comprising a salt with a polymeric anion.

4. The electrode according to claim 3, wherein the salt with a polymeric anion is selected from lithium or sodium salts of sulfonates, phosphates and acetates, or

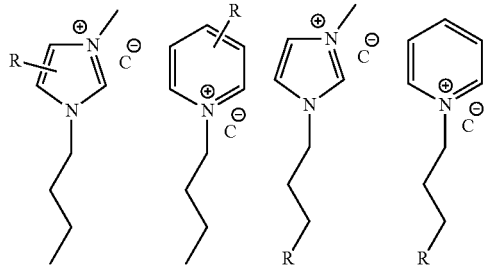

R = spacer + oxetane, MMa, styrene, etc.

A⊖ = anion.

5. The electrode according to claim 1, wherein the organic compound further comprises covalent bonded anionic groups.

6. The electrode according to claim 1, further comprising covalent bonded anionic groups and a cross-linked electrolyte in contact with the organic compound.

7. The electrode according to claim 1, further comprising at least one electrically conductive material.

8. The electrode according to claim 7, wherein the electrically conductive material is selected from a group consisting of battery soot, carbon black, carbon nanotubes (CNTs), and graphene.

9. The electrode according to claim 7, wherein the electrically conductive material includes less than 50 wt.-%, based on the total weight of the electrode.

10. The electrode according to claim 7, wherein the electrically conductive material includes at least 5 wt.-%, based on the total weight of the electrode.

11. The electrode according to claim 7, wherein the electrically conductive material includes 5 to 50 wt.-%, based on the total weight of the electrode.

12. The electrode according to claim 7, wherein the electrically conductive material includes 5 to 40 wt.-%, based on the total weight of the electrode.

13. The electrode according to claim 1, wherein in the electrode comprises a binder selected from the group consisting polyvinylidene fluoride, polytetrafluoroethylene, fluororubber (which is a terpolymer of tetrafluoroethylene, vinylidene fluoride and hexafluoropropylene), polyvinyl polymers such as polyvinylidene fluoride, polyvinylidene fluoride/hexafluoropropylene copolymer, polyacrylonitrile, polymethyl methacrylate, polytetrafluoroethylene (PTFE), a styrene-butadiene rubber-based polymer, polyvinylpyrrolidone, polyamides, polyurethanes; ethylene acrylic acid (EAA) copolymers, ethylene methacrylic acid (EMAA) copolymers, polyethylene (PE), polypropylene (PP), ethylene-propylene-diene terpolymers (EPDM), polybutylene, ionically cross-linked ethylene methacrylic acid copolymer, ethylene n-butyl acrylate (EnBA) polymers, ethylene vinyl acetate (EVA) polymers, ethylene ethyl acrylate (EEA) copolymer, ethylene methyl acrylate (EMA) copolymer, bisallylnadiimide or allylnadiimide, polysulfones, polyethersulfones, polyimides, polyamide-imides, epoxy resins, oxetane-resins, polyarylene ether ketones such as, chloromethylated polyarylene ether ketones, acryloylated polyarylene ether ketones, a nitrile rubber, an ethylene-propylene rubber, a styrene-butadiene rubber, polyetherimides, polystyrene, and the like and chloromethylated polyethersulfones and acryloylated polyethersulfones, polymethyl methacrylate, a polysulfide rubber, cyanoethyl cellulose, methyl cellulose, and oligomer and blends thereof.

14. The electrode according to claim 13, wherein the binder is present in an amount of up to 10 wt.-% of the electrode.

15. The electrode according to claim 1, wherein the electrode is metal-free.

16. An electronic device comprising the electrode according to claim 1.

* * * * *